United States Patent
Takahashi

(10) Patent No.: US 9,952,713 B2
(45) Date of Patent: Apr. 24, 2018

(54) TOUCH PANEL, DISPLAY DEVICE, AND TOUCH PANEL MANUFACTURING METHOD

(71) Applicant: KANEKA CORPORATION, Osaka-shi, Osaka (JP)

(72) Inventor: Yuji Takahashi, Ibaraki (JP)

(73) Assignee: Kaneka Corporation, Osaka-shi, Osaka (JP)

( * ) Notice: Subject to any disclaimer, the term of this patent is extended or adjusted under 35 U.S.C. 154(b) by 0 days.

(21) Appl. No.: 15/122,120

(22) PCT Filed: Jan. 29, 2015

(86) PCT No.: PCT/JP2015/052468
§ 371 (c)(1),
(2) Date: Aug. 26, 2016

(87) PCT Pub. No.: WO2015/146277
PCT Pub. Date: Oct. 1, 2015

(65) Prior Publication Data
US 2017/0017335 A1     Jan. 19, 2017

(30) Foreign Application Priority Data
Mar. 28, 2014   (JP) .................................. 2014-070552

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04111* (2013.01)

(58) Field of Classification Search
CPC ............ G06F 2203/04103; G06F 3/044; G06F 3/0416; G06F 2203/04111; G06F 3/0412
See application file for complete search history.

(56) References Cited

U.S. PATENT DOCUMENTS

2015/0177876 A1*  6/2015  Ishii .................. G06F 3/044
                                                  345/174

FOREIGN PATENT DOCUMENTS

| JP | H09258894 A | 10/1997 |
| JP | 2009259063 A | 11/2009 |

(Continued)

OTHER PUBLICATIONS

International Bureau of WIPO, International Preliminary Report on Patentability Issued in Application No. PCT/JP2015/052468, dated Oct. 4, 2016, WIPO, 9 pages.

(Continued)

*Primary Examiner* — Abhishek Sarma
(74) *Attorney, Agent, or Firm* — Alleman Hall Creasman & Tuttle LLP

(57) ABSTRACT

Provided are a touch panel, a displaying unit, and a touch panel manufacturing method that make it possible to thin a wiring line and that suppress visibility of a wiring line to improve appearance. A first electrode group extends in a direction intersecting with a second electrode group in plan view. A large part of a first wiring line or the entire first wiring line is arranged so as to overlap a light-shielding part in the entire line width thereof in plan view. On the basis of a display device, a first electrode part is located on an outer side of a dielectric part and the first wiring line and/or a second wiring line has a line width varied according to a height, and has a line width in an outermost region smaller than a line width in an innermost region.

11 Claims, 27 Drawing Sheets

(56) References Cited

FOREIGN PATENT DOCUMENTS

| JP | 2012033072 A | 2/2012 |
|----|--------------|--------|
| JP | 2012103761 A | 5/2012 |
| JP | 2012185607 A | 9/2012 |
| JP | 2012198740 A | 10/2012 |
| JP | 2013069257 A | 4/2013 |
| JP | 5224203 B1 | 7/2013 |

OTHER PUBLICATIONS

ISA Japan Patent Office, International Search Report Issued in Application No. PCT/JP2015/052468, dated Apr. 21, 2015, WIPO, 4 pages.

* cited by examiner

A-A SECTIONAL VIEW

B-B SECTIONAL VIEW

C-C SECTIONAL VIEW

D-D SECTIONAL VIEW

LIGHT

LIGHT

A-A SECTIONAL VIEW

A-A SECTIONAL VIEW

A-A SECTIONAL VIEW

TOUCH PANEL, DISPLAY DEVICE, AND TOUCH PANEL MANUFACTURING METHOD

TECHNICAL FIELD

The present invention relates to a touch panel. In particular, the present invention relates to a projected capacitive touch panel. The present invention also relates to a displaying unit provided with the touch panel. The present invention further relates to a method for manufacturing the touch panel.

BACKGROUND ART

In the related art, a projected capacitive touch panel is known as an input device for an electronic device such as a computer or a portable information terminal.

This projected capacitive touch panel incorporates therein a large number of X-axis electrodes extending in a predetermined direction (hereinbelow, referred to as an X-axis direction) and a large number of Y-axis electrodes extending in a direction perpendicular (hereinbelow, referred to as a Y-axis direction) to the predetermined direction. Moreover, the X-axis electrodes and the Y-axis electrodes are arranged in a matrix, and a controller is connected to each of the X-axis electrodes and each of the Y-axis electrodes. Then, the touch panel has a structure where when a user operates the touch panel with a finger or the like, a capacitance value between each electrode and the finger or the like is detected to specify an operation position of the user.

Now, a touch panel that uses thin metal wire made of, for example, gold for the X-axis electrodes and the Y-axis electrodes is known in order to use the touch panel, for example, in a display device with a large screen (for example, Patent Documents 1, 2).

In this touch panel that uses the thin metal wire, a substrate is patterned by laminating a metal layer such as gold thereon to form a large number of lines of fine thin metal wire on the substrate.

An example of this touch panel that uses the thin metal wire includes a touch panel in which two substrates on each of which a large number of lines of thin metal wire are arranged parallel to each other are made, and these substrates are stacked one on another to form the above X-axis electrodes and the above Y-axis electrodes.

In this touch panel using the thin metal wire, a large number of wiring lines are formed of the thin metal wire in parallel. Thus, it is possible to reduce resistance of the wiring lines, and the touch panel can be used suitably, for example, in a display device with a large screen. Moreover, in this touch panel, peripheral wiring lines can be formed of the same material as that of the thin metal wire, and the peripheral wiring lines and the thin metal wire can be formed on the same plane at once. Thus, it also becomes possible to reduce manufacturing steps.

Now, a display surface of a common display device is provided with a pixel part that includes sub-pixels of red (R), green (G), and blue (B) and a black matrix in a grid-like form that partitions the sub-pixels.

In the above touch panel, the thin metal wire is laid in a grid-like form in the X-axis direction and the Y-axis direction. Thus, when this touch panel is placed on the display surface of the display device, the thin metal wire overlaps the pixel part which displays color information, and the thin metal wire shields light from the sub-pixel parts. That is, in this touch panel, since a part of the pixel part is blocked by the thin metal wire and an aperture ratio of the pixel part is reduced, there is a problem of a reduction in luminance of the display device. Moreover, since the thin metal wire having a regular repeated shape and the black matrix also having a regular repeated shape overlap each other obliquely in a planar manner, periodic intersecting parts are generated in the thin metal wire and the black matrix, and the periodically-generated intersecting regions shield light from the pixel part. Thus, there is a problem of generation of moire and deterioration in quality.

Thus, Patent Document 1 proposes an approach to improving invisibility of the thin metal wire and preventing reduction in luminance of the display device by forming the thin metal wire so as to have a width narrower than the width of the black matrix, and by arranging the thin metal wire so as to overlap the black matrix. In addition to the above, there are Patent Documents 3, 4 as documents that describe the related art to the present invention.

PRIOR ART DOCUMENTS

Patent Documents

Patent Document 1: JP 2009-259063 A
Patent Document 2: JP 09-258894 A
Patent Document 3: JP 2012-103761 A
Patent Document 4: JP 2013-069257 A

DISCLOSURE OF INVENTION

Technical Problem

In recent years, definition of a display device has become higher, a size of each sub-pixel part has become smaller, and the width of a black matrix has also become thinner. That is, in order to maintain invisibility of the thin metal wire, it is necessary to thin the thin metal wire, corresponding to a decrease in the width of the black matrix.

Thus, the present inventor has prototyped a touch panel 200 as illustrated in FIG. 29 and has attempted thinning the thin metal wire.

As can be seen from FIGS. 29 and 30, this prototyped touch panel 200 is formed in such a manner that a film substrate 205 which includes a large number of lines of thin metal wire 201 on one face thereof and a film substrate 206 which includes a large number of lines of thin metal wire 202 on one face thereof are bonded to each other with an optical clear adhesive film 207 such that the thin metal wire 201 faces the thin metal wire 202.

In this prototyped touch panel 200, the thin metal wire 201, 202 is formed of a colored metal such as copper, and the thin metal wire 201 and the thin metal wire 202 are arranged in a grid-like form in plan view as illustrated in FIG. 30. Then, the touch panel 200 has a structure where a controller (not illustrated) is connected to the thin metal wire 201, 202 and capacitance is detected for the thin metal wire 201 and the thin metal wire 202 to identify an operation position of a user.

In this prototyped touch panel 200, the line width of the thin metal wire 201, 202 is narrowed in order to make the thin metal wire 201, 202 thinner than common thin metal wire, and the thickness of the thin metal wire 201, 202 is made large to ensure a conductive path. Then, as can be seen from FIG. 29, this prototyped touch panel 200 is placed on a display device 208 such that the thin metal wire 201, 202 overlaps a black matrix 209 in the thickness direction, and a displaying unit 210 is formed.

A study made on this displaying unit 210 shows that there is the following problem.

That is, in the prototyped touch panel 200, the thickness of the thin metal wire 201, 202 is made large to ensure sufficient wiring resistance. Naturally, when the thickness of the thin metal wire 201, 202 is made large, the cross-sectional area increases. Thus, it is possible to reduce wiring resistance in the touch panel 200.

However, in the prototyped touch panel 200, since the thickness of the thin metal wire 201, 202 is large, a portion of light from the pixels of the display device 208 is reflected by side faces of the thin metal wire 201, 202 and thereby travels toward a user. Thus, color of the thin metal wire 201, 202 becomes conspicuous in the touch panel 200, and a problem of deterioration in appearance (quality) occurs.

Thus, it is an object of the present invention to provide a touch panel that makes it possible to thin a wire line and that suppresses visibility of the wire line to improve appearance, and a displaying unit using the touch panel. Moreover, it is an object of the present invention to provide a method for manufacturing a touch panel that makes it possible to thin a wire line and that suppresses visibility of the wire line to improve appearance.

Solution to Problem

One aspect of the present invention to solve the above problem is a touch panel attached to a display device, the display device including a pixel part that includes a plurality of sub-pixel parts and that displays color information and a light-shielding part that partitions the sub-pixel parts, the touch panel being placed so as to cover the pixel part and the light-shielding part, the touch panel including a first electrode part that includes a first electrode group having one or more first wiring lines, a second electrode part that includes a second electrode group having one or more second wiring lines, and a dielectric part interposed between the first electrode part and the second electrode part, wherein the first electrode group extends in a direction intersecting with the second electrode group in plan view, wherein a large part of the first wiring line or the entire first wiring line is arranged so as to overlap the light-shielding part in an entire line width thereof in plan view, wherein the first electrode part is located in an outer side of the dielectric part on the basis of the display device, and wherein the first wiring line and/or the second wiring line has a line width varied according to a height, and has a line width in an outermost region smaller than a line width in an innermost region on the basis of the display device.

The "line width" described herein indicates a length that is perpendicular to an extending direction in plan view.

The "large part" described herein indicates a part that is 80% or more of the entire first wiring line.

The "dielectric part" described herein indicates a region or a member formed of a material that has superiority in dielectricity over conductivity.

According to this aspect, there is a positional relationship in which the second electrode part, the dielectric part, and the first electrode part are located in this order from the display device side, and the first electrode part is located closer to a user side than the second electrode part is.

Moreover, according to this aspect, since the first wiring line and/or the second wiring line is narrowed in a diffusion direction of light from the display device (the direction toward a user), light from the pixel part is less prone to strike a side face of the first wiring line and/or the second wiring line, and invisibility of the first wiring line and/or the second wiring line can be enhanced.

Further, according to this aspect, since the first wiring line and/or the second wiring line has the line width on the outermost side (the user side) smaller than the line width on the innermost side, the area of the outer end in the thickness direction of the first wiring line and/or the second wiring line is smaller than the area of the inner end. Thus, light from the user side is less prone to be reflected by the outer end, and glare owing to such reflection can also be suppressed.

According to this aspect, the first electrode group that includes the one or more first wiring lines and the second electrode group that includes the one or more second wiring lines intersect with each other in plan view. That is, when a user operates the touch panel, an operation position of the user can be specified by sensing capacitance in each of the electrode groups.

According to this aspect, a large part of the first wiring line or the entire wiring line is arranged to overlap the light-shielding part in the entire line width thereof in plan view. That is, the first wiring line is arranged in a region that is not irradiated with light from the display device. Thus, transmittance improves and it is possible to reduce power consumption, as compared to the related art. Moreover, according to this aspect, it is possible to improve invisibility of the first wiring line and also improve display quality, as compared to the related art.

In a preferred aspect, the first wiring line has a line width varied according to a height, a line width in the outermost region smaller than a line width in the innermost region on the basis of the display device, and further the line width gradually increases from an outer end toward an inner side.

According to this aspect, a part of the side face or the entire side face of the first wiring line includes an inclined region that is inclined at least from the outer end toward the inner side. Thus, an effect of invisibility of the first wiring line is more remarkably exhibited.

In a preferred aspect, a maximum line width of the first wiring line is smaller than a maximum line width of the second wiring line.

According to this aspect, the maximum line width of the first wiring line located on a side close to the eyes of a user is smaller than the maximum line width of the second wiring line located on a side far from the eyes of the user. That is, the maximum line width of the second wiring line is made larger than the maximum line width of the first wiring line for using visible performance of a user depending on the positional relationship. Thus, it is possible to reduce the thickness of the second wiring line as compared to the first wiring line. Accordingly, the thickness of the entire touch panel can be reduced.

In a preferred aspect, the second wiring line has a line width varied according to a height, a line width in the outermost region smaller than a line width in the innermost region on the basis of the display device, and further the line width gradually increases from an outer end toward an inner side.

According to this aspect, a part of the side face or the entire side face of the second wiring line includes an inclined part that is inclined at least from the outer end toward the inner side. Thus, an effect of invisibility of the second wiring line is more remarkably exhibited.

Now, in the prototyped touch panel 200, as an approach to integrating the film substrates 205, 206 together at the time of assembly as described above, the optical clear adhesive film 207 is used for bonding.

However, in the touch panel 200 prototyped as described above, the thickness of the thin metal wire 201, 202 is made large. Thus, as can be seen from FIG. 31, when the optical clear adhesive film 207 is bonded, the optical clear adhesive film 207 abuts onto corners of the thin metal wire 201, 202. That is, the optical clear adhesive film 207 is stuck on the corners of the thin metal wire 201, 202, and gaps 211 are formed between the side faces of the thin metal wire 201, 202 and the optical clear adhesive film 207. Thus, in the prototyped touch panel 200, the thin metal wire 201, 202 and the optical clear adhesive film 207 are not brought into sufficiently close contact with each other due to the existence of the gaps 211. Thus, the touch panel 200 appears to contain large air bubbles or the like, and is often formed with poor appearance. As a result, a yield of the prototyped touch panel 200 is low.

Thus, in a more preferred aspect, the dielectric part includes a film-like adhesive part covering the second wiring line from an outer side on the basis of the display device, the adhesive part closely contacting with a side face of the second wiring line substantially with no gap therebetween.

The "close contact substantially with no gap therebetween" described herein indicates a state of closely contacting without incorporating an air bubble or the like having a diameter of 100 nm or more.

According to this aspect, the film-like adhesive part covers the side face of the second wiring line having the line width gradually increased from the outer end toward the inner side, and is in close contact with the side face substantially with no gap therebetween. Thus, an air bubble is less prone to be incorporated between the second wiring line and the dielectric part, and excellent appearance is achieved. Moreover, it is also possible to suppress generation of a defective piece and a yield of the touch panel becomes high.

In a preferred aspect, the first electrode group includes at least two first wiring lines arranged in parallel at a predetermined interval and a first redundant line connecting the two first wiring lines.

According to this aspect, since the two first wiring lines belonging to the one first electrode group are connected through the first redundant line, the two first wiring lines are in an electrically parallel connection relationship by the first redundant line. Thus, even when a part of the first wiring line breaks, current flow can be compensated through the first redundant line, and a conductive path in the entire first electrode group can be ensured. Thus, it is possible to suppress generation of a defective sensing piece and to enhance yield.

In view of ensuring the conductive path of the first electrode group, the first redundant line is not necessarily required to have the same cross-sectional area as the cross-sectional area of the first wiring line. That is, it is possible to thin the first redundant line to some extent as compared to a main wiring line such as the first wiring line.

Thus, in a preferred aspect, the first redundant line overlaps the second wiring line in an entire line width in plan view, and a maximum line width of the first redundant line is smaller than the maximum line width of the second wiring line.

According to this aspect, the first redundant line located on the side close to a user is arranged so as to overlap the second wiring line located on the side far from the user in plan view, and the maximum line width of the first redundant liner is smaller than the maximum line width of the second wiring line. Thus, it is possible to ensure a position to place the first redundant line while preventing reduction in an aperture ratio owing to the existence of the first redundant line.

In a preferred aspect, the second electrode group includes at least two second wiring lines arranged in parallel at a predetermined interval, and a second redundant line connecting the two second wiring lines.

According to this aspect, since the two second wiring lines belonging to the one second electrode group are connected through the second redundant line, the two second wiring lines are in an electrically parallel connection relationship by the second redundant line. Thus, even when a part of the second wiring line breaks, current flow can be compensated through the second redundant line, and a conductive path in the entire second electrode group can be ensured. Thus, it is possible to suppress generation of a defective sensing piece and to enhance yield.

In the above aspect, a part of the first wiring line may overlap the second redundant line in the entire line width in plan view.

According to this aspect, a position to place the second redundant line can be ensured.

In a more preferred aspect, the first wiring line is formed of metal and opaque.

The "being opaque" described herein indicates a state where light transmittance is 5% or less.

According to this aspect, the first wiring line is made of metal and has a thickness in the extent where the first wiring line becomes opaque. Even in such a case, according to this aspect, invisibility of the first wiring line is high.

In the above aspect, the second wiring line may be formed of metal and opaque.

According to this aspect, the second wiring line is made of metal and has a thickness in the extent where the second wiring line becomes opaque. Even in such a case, according to this aspect, invisibility of the second wiring line is high.

In the above aspect, on the basis of the display device, the first wiring line and/or the second wiring line may include an outer end face that is the outermost region and an inner end face that is the innermost region, and the outer end face may be located on the center in the width direction of the inner end face in plan view.

An aspect relating to the above invention is a displaying unit including a display section including a pixel part that includes a plurality of sub-pixel parts and displays color information and a light-shielding part that partitions the sub-pixel parts, and a touch panel section arranged so as to cover the pixel part and the light-shielding part, and the displaying unit includes a first electrode part, a second electrode part, and a dielectric part interposed between the first electrode part and the second electrode part, the first electrode part includes a first electrode group including one or more first wiring lines, the second electrode part includes a second electrode group including one or more second wiring lines, the first electrode group extends in a direction intersecting with the second electrode group in plan view, a large part of the first wiring line or the entire first wiring line is arranged so as to overlap the light-shielding part in an entire line width thereof in plan view, the first electrode part is located on an outer side of the dielectric part on the basis of the display device, and the first wiring line and/or the second wiring line has a line width varied according to a height, and has a line width in an outermost region smaller than a line width in an innermost region.

According to this aspect, it is possible to improve invisibility of the first wiring line and/or the second wiring line. In addition, light from the user side is less prone to be reflected by the outer end face, and glare owing to such reflection and deterioration in appearance can be suppressed.

According to this aspect, transmittance is improved and it is possible to reduce power consumption, as compared to the related art. Moreover, it is possible to improve invisibility of the first wiring line and also improve display quality, as compared to the related art.

One aspect of the present invention is a displaying unit including the touch panel according to the above aspect and the display device including the pixel part and the light-shielding part.

According to this aspect, in the displaying unit, the first electrode group and the second electrode group of the touch panel are less prone to be visually recognized.

Now, in the case of a display device such as a liquid crystal panel, a viewing angle is typically narrow. Thus, in order to expand the viewing angle thereof, a display on the touch panel may be realized by refracting light from a liquid crystal. In this case, a refractive index of a member located between a pixel part and the touch panel is adjusted or a new member is introduced to refract light emitted from the liquid crystal, and to cause incident light on the touch panel in a state where the light is expanded at a predetermined angle.

In this manner, the viewing angle becomes wide. However, on the other hand, when light is incident on the touch panel at an acute angle, the light is prone to be reflected by the side face of the first wiring line located on the user side. That is, there is a problem in the first wiring line that is prone to be visible from a user.

Thus, in a preferred aspect, the displaying unit includes a refractive member that refracts light from the sub-pixel parts, the refractive member being interposed between the touch panel and the sub-pixel parts, wherein the first wiring line includes a first end abutting onto the dielectric part and a side face part extending in a direction intersecting with the first end, the side face part being an inclined surface inclined with respect to the first end, and wherein when light from the sub-pixel parts is perpendicularly incident onto the refractive member, and an incident angle on the touch panel of the light refracted by the refractive member is σ, an inclination angle of the inclined surface with respect to the first end is (90−σ) or less.

According to this aspect, since light refracted by the refractive member is transmitted while avoiding the first wiring line, deterioration in quality owing to the reflection of light by the side face part of the first wiring line can be prevented. Moreover, since the reflection of light by the first wiring line can be prevented, it is possible to improve light transmittance.

Moreover, in the above aspect, the first wiring line may include a first end abutting onto the dielectric part and a side face part extending in a direction intersecting with the first end, the side face part may be an inclined surface inclined with respect to the first end, and when an incident angle on the touch panel of light from the display device side is δ, an inclination angle of the inclined surface with respect to the first end may be (90−δ) or less.

In the above aspect, a region of 90% or more of the first wiring line may be arranged so as to overlap the light-shielding part in plan view.

In the above aspect, a region of 90% or more of the second wiring line may be arranged so as to overlap the light-shielding part in plan view.

In the above aspect, the first wiring line and/or the second wiring line may include a cross section perpendicular to the longitudinal direction having any of a triangular shape, a trapezoidal shape, a semicircular shape, a semi-elliptical shape, and a hexagonal shape.

One aspect of the present invention is a method for manufacturing the touch panel according to the above aspect, the touch panel including a substrate that supports the first electrode group or the second electrode group, the substrate supporting the first wiring line or the second wiring line that has a side face and that is formed of a conductive layer at least on the side face, the method including an electrode group forming step for forming the first electrode group or the second electrode group on the substrate, the electrode group forming step including a base layer forming step for forming a base layer on the substrate, a resist layer forming step for forming a resist layer on the base layer, a through hole forming step for forming a through hole on the resist layer, a conductive layer forming step for forming a conductive layer on the base layer through the through hole, and a resist removing step for removing the resist layer from the base layer, wherein the through hole is a long groove extending in a predetermined direction, and wherein an interval between inner side faces in a cross section perpendicular to an extending direction of the through hole is gradually varied in a thickness direction of the resist layer.

The "cross section perpendicular to an extending direction of the through hole" described herein indicates a cross section in a direction perpendicular to the resist layer and a plane formed by a width-direction component and a depth-direction component of the through hole.

According to this aspect, since at least a part of the inner side face of the first wiring line or the second wiring line is inclined in the through hole forming step, the side face of the first wiring line or the second wiring line can be formed while the inclination of the inner side face is reflected in the conductive layer forming step. Thus, a side face shape of the first wiring line or the second wiring line can be easily controlled. Moreover, when the touch panel includes a plurality of the first wiring lines or a plurality of the second wiring lines, side face shapes of the plurality of first wiring lines or the plurality of second wiring lines can be simultaneously formed by forming a plurality of the through holes of the resist layer. Thus, manufacturing time can be shortened.

One aspect of the present invention is a method for manufacturing the touch panel according to the above aspect the touch panel including a substrate that supports the first electrode group or the second electrode group, the substrate supporting the first wiring line or the second wiring line that has a side face and that is formed of a conductive layer at least on the side face, the method including an electrode group forming step for forming the first electrode group or the second electrode group on the substrate, the electrode group forming step including a conductive layer forming step for forming a conductive layer on the substrate, a resist layer forming step for forming a resist layer patterned in a predetermined shape on the conductive layer, an etching step for etching a part of the conductive layer or the entire conductive layer with an etching solution, and a resist removing step for removing the resist layer from the conductive layer, wherein a side face shape of the first wiring line or the second wiring line is formed in the etching step.

According to this aspect, since the side face shape of the first wiring line or the second wiring line is formed in the etching step, a side face shape thereof can be easily controlled. Moreover, when the touch panel includes a plurality of the first wiring lines or a plurality of the second wiring lines, side face shapes of the plurality of first wiring lines or the plurality of second wiring lines can be simultaneously formed. Thus, manufacturing time can be shortened.

One aspect of the present invention is a method for manufacturing the touch panel according to the above aspect the touch panel including a substrate that supports the first electrode group or the second electrode group, the substrate supporting the first wiring line or the second wiring line that has a side face and that is formed of a conductive layer at least on the side face, the method including an electrode group forming step for forming the first electrode group or the second electrode group on the substrate, the electrode group forming step including a conductive layer forming step for forming a conductive layer on the substrate and a laser step for irradiating with laser light to remove a part of the conductive layer, wherein a side face shape of the first wiring line or the second wiring line is formed by an intensity distribution of the laser light in the laser step.

The "intensity distribution of the later light" described herein indicates an intensity distribution immediately before irradiation with laser light from a laser generator.

According to this aspect, since the side face shape of the first wiring line or the second wiring line is formed by the intensity distribution of the laser light, the first wiring line or the second wiring line can be patterned without using a resist or the like. Thus, it is possible to reduce a manufacturing cost.

Effect of Invention

According to the touch panel and the displaying unit of the present invention, it is possible to improve invisibility of the first wiring line and/or the second wiring line, and accordingly it is possible to improve display quality. Moreover, since it is possible to suppress shielding light owing to the existence of the first wiring line and/or the second wiring line, it is also possible to improve transmittance. Further, it is possible to thin a wiring line, and visibility of the wiring line is suppressed to improve appearance.

According to the method for manufacturing the touch panel of the present invention, it is possible to easily form the side face shape of the first wiring line.

BRIEF DESCRIPTION OF DRAWINGS

FIG. 5A is a sectional view of the principal part of the touch panel taken along line A-A, and FIG. 5B is a sectional view of the principal part of the touch panel taken along line B-B.

FIG. 6A is a sectional view of the principal part of the touch panel taken along line C-C, and FIG. 6B is a sectional view of the principal part of the touch panel taken along line D-D.

FIG. 7A is a plan view illustrating a first electrode part, and FIG. 7B is a plan view illustrating a second electrode part.

FIG. 15A is an explanatory diagram when a side face part of a first wiring line has an inclined surface, and FIG. 15B is an explanatory diagram when the side face part of the first wiring line has no inclined surface.

FIG. 16A is an explanatory diagram when the side face part of the first wiring line has the inclined surface, and FIG. 16B is an explanatory diagram when the side face part of the first wiring line has no inclined surface.

FIG. 25A is a sectional view, and FIG. 25B is a sectional view taken along line A-A of FIG. 25A.

FIG. 26A is a sectional view, and FIG. 26B is a sectional view taken along line A-A of FIG. 26A.

FIG. 27A is a sectional view, and FIG. 27B is a sectional view taken along line A-A of FIG. 27A.

BEST MODE FOR CARRYING OUT THE INVENTION

The present invention relates to a displaying unit 1. Hereinbelow, an up-down positional relationship will be described based on a posture in FIG. 1 unless otherwise specifically noted. That is, a side having a touch panel 2 corresponds to an upper side, and a side having a display device 3 corresponds to a lower side. Moreover, in the following description, physical properties are indicated by a value in a normal state (1 atm, 25° C.) unless otherwise specifically noted.

Figure 1:
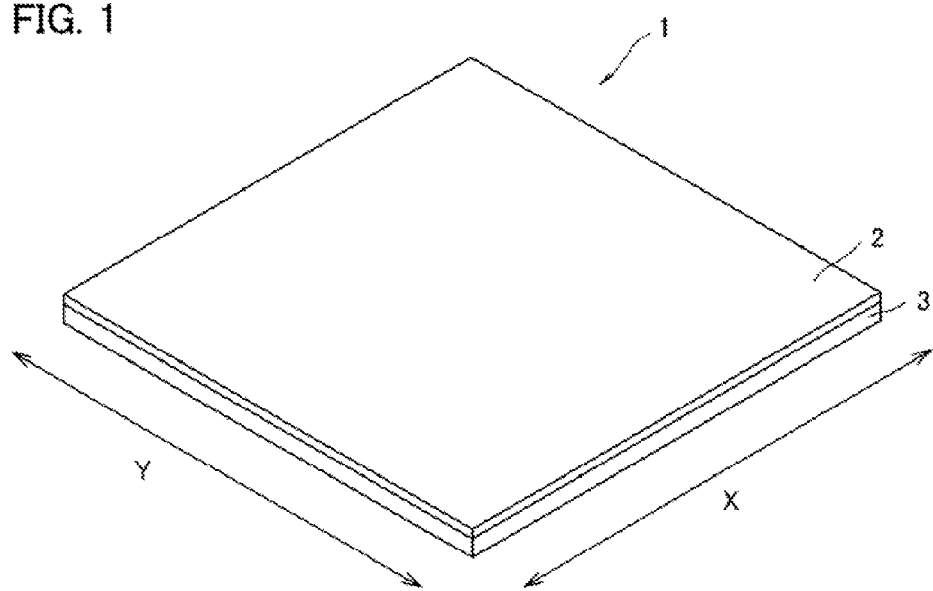
FIG. 1 is a perspective view schematically illustrating a displaying unit according to a first embodiment of the present invention.
Figure 2:
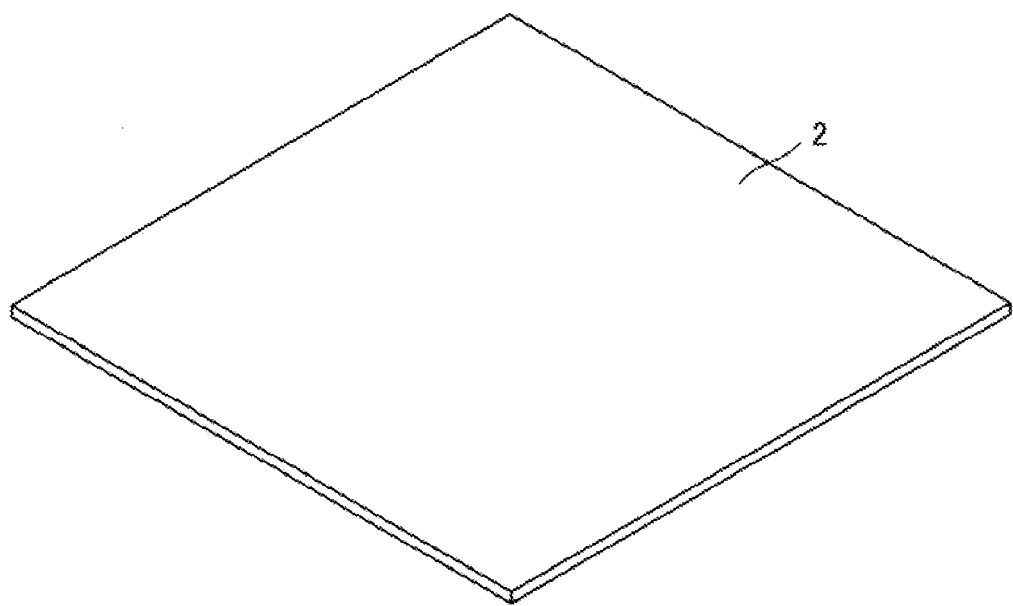
FIG. 2 is an exploded perspective view of the displaying unit of FIG. 1.
Figure 2:
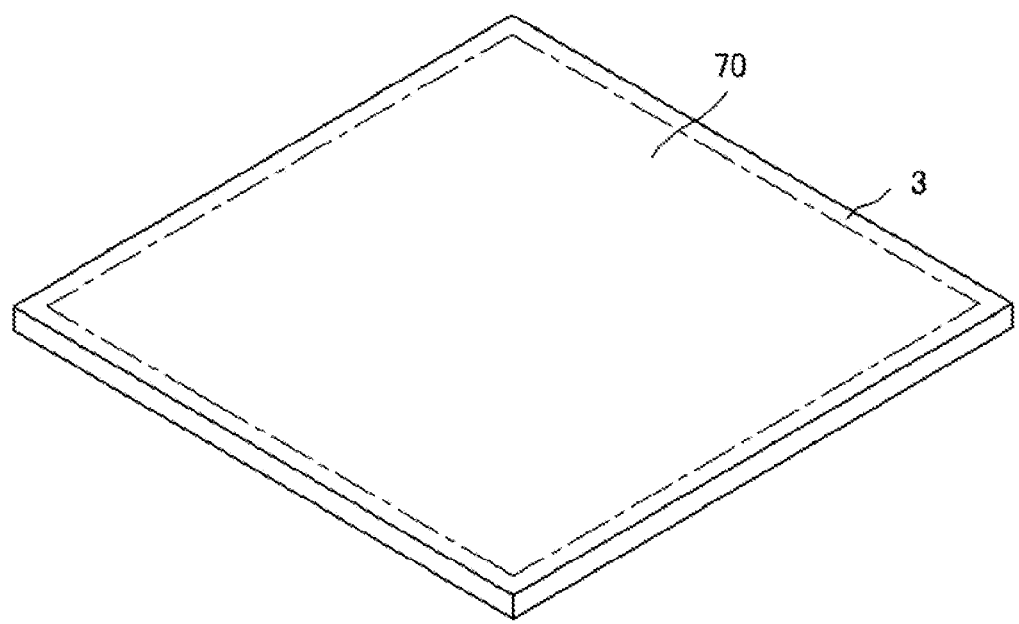

As illustrated in FIGS. 1 and 2, the displaying unit 1 of the present embodiment is provided with the touch panel 2 and the display device 3.

The touch panel 2 is a projected capacitive touch panel, and is capable of sensing an operation by a fingertip or the like, and inputting the sensed operation to the display device 3 or an external device such as a computer. Moreover, the touch panel 2 is a matrix touch panel among projected capacitive touch panels.

Figure 3:
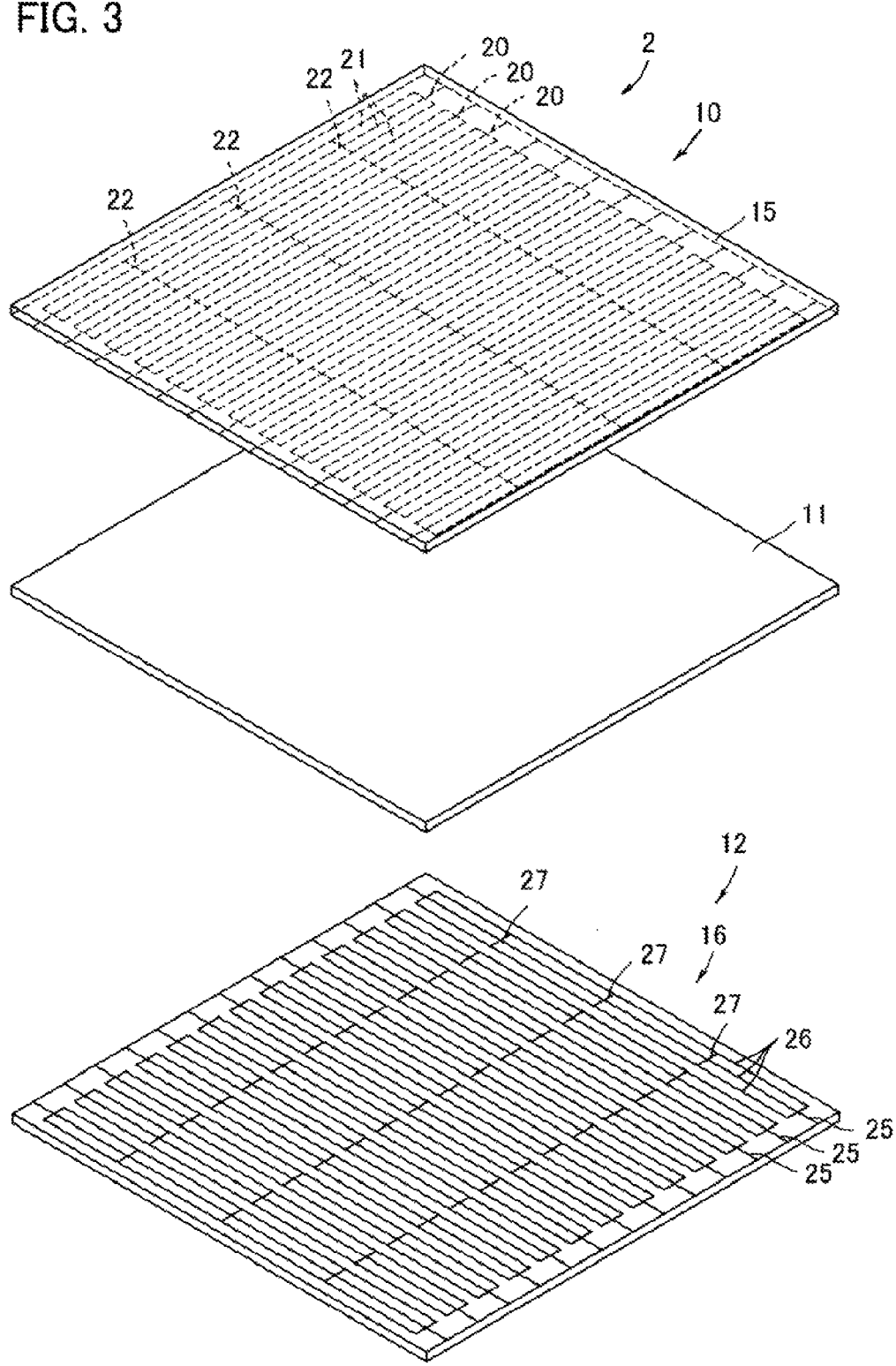
FIG. 3 is an exploded perspective view of a touch panel of FIG. 1.

As illustrated in FIG. 3, the touch panel 2 includes a first electrode part 10, a dielectric member 11 (dielectric part), and a second electrode part 12.

Figure 7A:
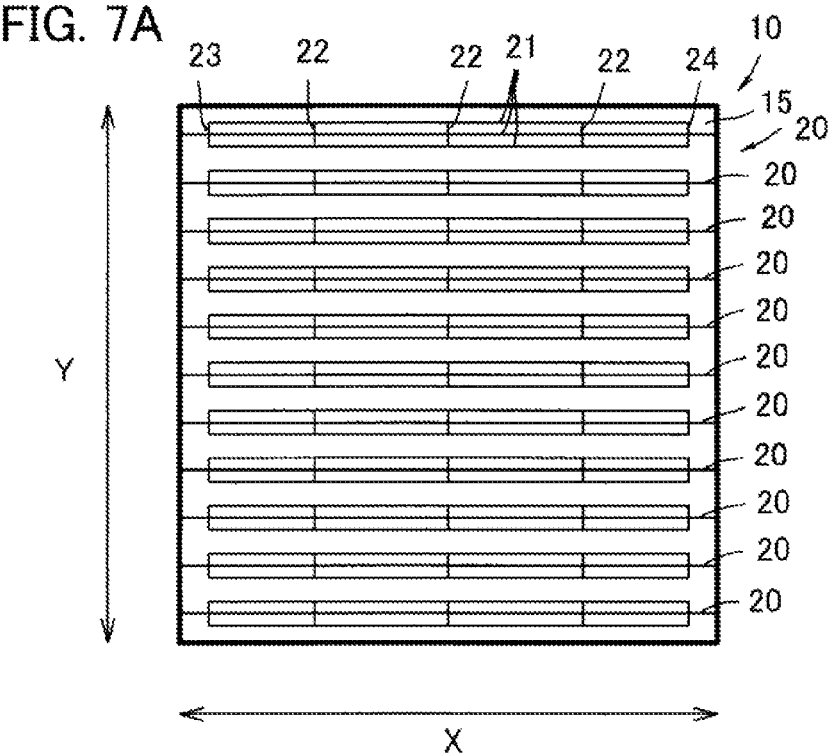
FIGS. 7A and 7B are explanatory diagrams of the touch panel of FIG. 3, where

As illustrated in FIG. 7A, the first electrode part 10 includes a plurality of first electrode groups 20 which is spread in a planar form and distributed on a first substrate 15 (substrate). In the first electrode part 10, the respective first electrode groups 20 are arranged in parallel at a predetermined interval in a lengthwise direction Y. Moreover, the respective first electrode groups 20 are parallel to each other.

The first substrate 15 is a transparent substrate that supports the first electrode groups 20, and is a plate-like or film-like insulating substrate.

The first substrate 15 is not particularly limited as long as it has an insulating property. For example, an insulating substrate made of a transparent material such as glass, polyester, polyethylene terephthalate (PET), polycarbonate, polymethyl methacrylate, and polyethylene naphthalate can be employed.

Moreover, a refractive index of the first substrate 15 is preferably from 1.40 to 1.70.

The first substrate 15 of the present embodiment uses a PET film, and a refractive index thereof is approximately 1.58.

As illustrated in FIG. 3, each of the first electrode groups 20 includes at least one first wiring line 21.

Although the number of first wiring lines 21 constituting the first electrode group 20 is not particularly limited, the number of the first wiring lines 21 is preferably two or more, and more preferably three or more.

Due to the first electrode group 20 formed of the plurality of first wiring lines 21, sensing of capacitance in response to an operation by a user becomes more accurate. Moreover, since the respective first wiring lines 21 are electrically connected in parallel, wiring resistance reduces and a response speed improves.

On the other hand, when the first electrode group 20 includes a too large number of the first wiring lines 21, the first electrode group 20 shields light from the display device 3, luminance of the display device 3 reduces, and the first wiring lines 21 are visible from a user side. As a result, an appearance becomes poor. Thus, although depending on a size of the display device 3, the number of the first wiring lines 21 constituting each of the first electrode groups 20 is preferably 50 or less, more preferably 20 or less, and further preferably 10 or less.

Note that although in the present embodiment, each of the first electrode groups 20 actually includes the nineteen first wiring lines 21, in each of the drawings, only the three first wiring lines 21 are illustrated for each of the first electrode groups 20 in order to facilitate understanding.

Figure 4:
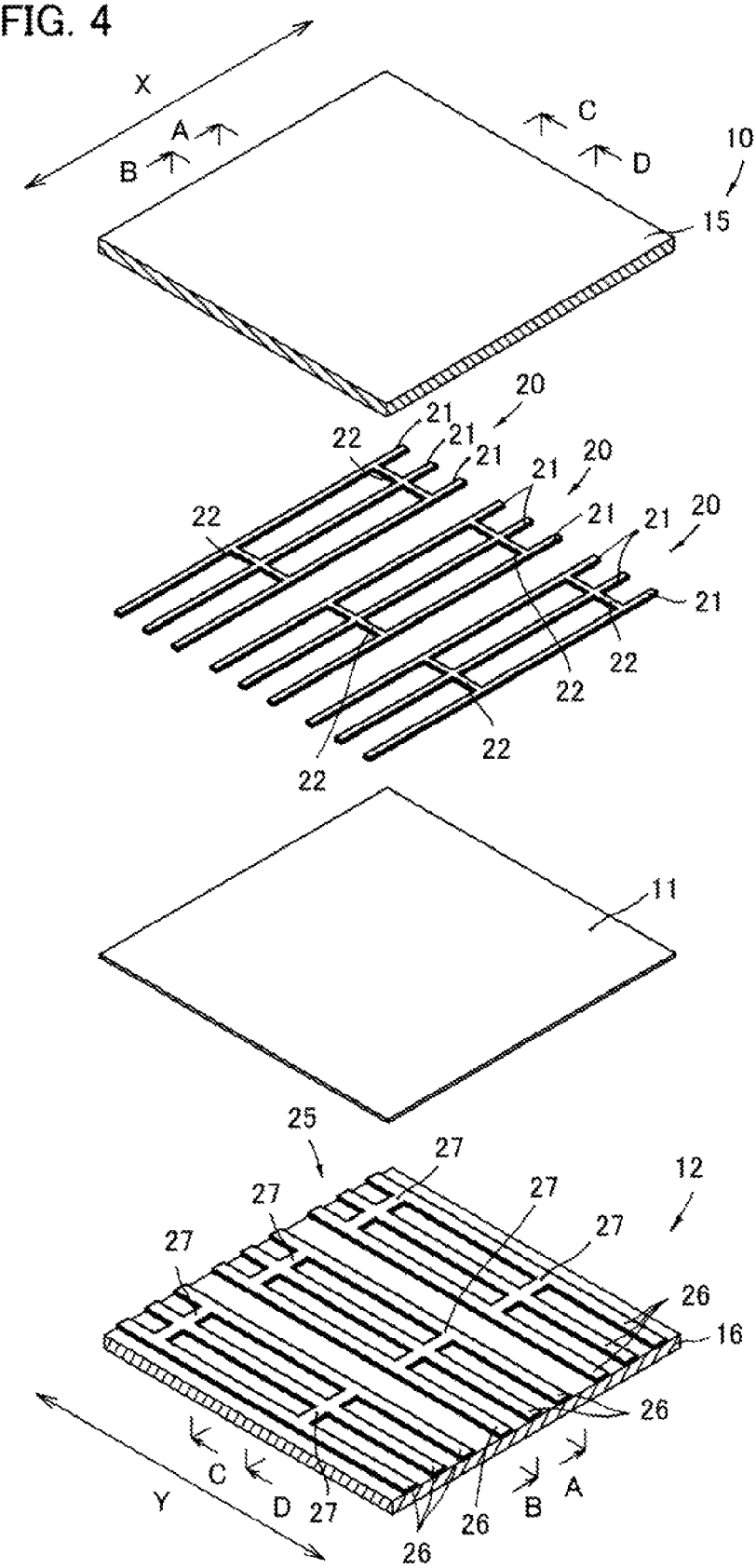
FIG. 4 is an exploded perspective view of a principal part of the touch panel of FIG. 3.

Moreover, as illustrated in FIGS. 4 and 7A, the first electrode group 20 includes the plurality of first wiring lines 21. Further, the first electrode group 20 includes a first redundant line 22 and first connection parts 23, 24, which connect the adjacent first wiring lines 21, 21.

Each of the first wiring lines 21 is a region that has a function of sensing an operation position of a user. Each of the first wiring lines 21 is conductive wire linearly extending in a transverse direction X. The respective first wiring lines 21 are aligned in parallel at a predetermined interval in the lengthwise direction Y.

The first wiring line 21 is not particularly limited as long as it is a conductor. For example, the first wiring line 21 can be formed of metal such as copper, silver, gold, platinum, aluminum, and chrome, a metal alloy of these metals, or a metal complex of these metals.

In the present embodiment, the first wiring line 21 is formed of copper which is a colored metal, and the first wiring line 21 has a certain thickness or more, and is opaque.

Non-conductor component content in the first wiring line 21 is preferably 0% or more and 10% or less of all components, and more preferably 2% or less in view of further reduction in resistance.

The "non-conductor component" described herein indicates a component other than a conductor and indicates an impurity component having substantially no conductivity such as a resin and organic matter.

The first connection parts 23, 24 are regions that connect ends of the adjacent first wiring lines 21, 21, and are regions that electrically connect the respective first wiring lines 21 in parallel.

As illustrated in FIGS. 4 and 7A, the first redundant line 22 is conductive wire that extends in a direction intersecting with the first wiring line 21, and the first redundant line 22 connects intermediate parts of the adjacent first wiring lines 21, 21.

The first redundant line 22 of the present embodiment is perpendicular to the longitudinal direction of the first wiring line 21 and extends in the lengthwise direction Y (the direction perpendicular to the transverse direction X).

Note that the "intermediate parts" described herein each indicate an intermediate region in the longitudinal direction, and indicates a region other than an end.

The first redundant line 22 is not particularly limited as long as it is a conductor. For example, the first redundant line 22 can be formed of metal such as copper, silver, gold, platinum, aluminum, and chrome, a metal alloy of these metals, or a metal complex of these metals.

In the present embodiment, the first redundant line 22 is formed of the same material as the first wiring line 21.

Here, a cross-sectional shape of each region of the first electrode group 20 will be described.

Figure 5A:
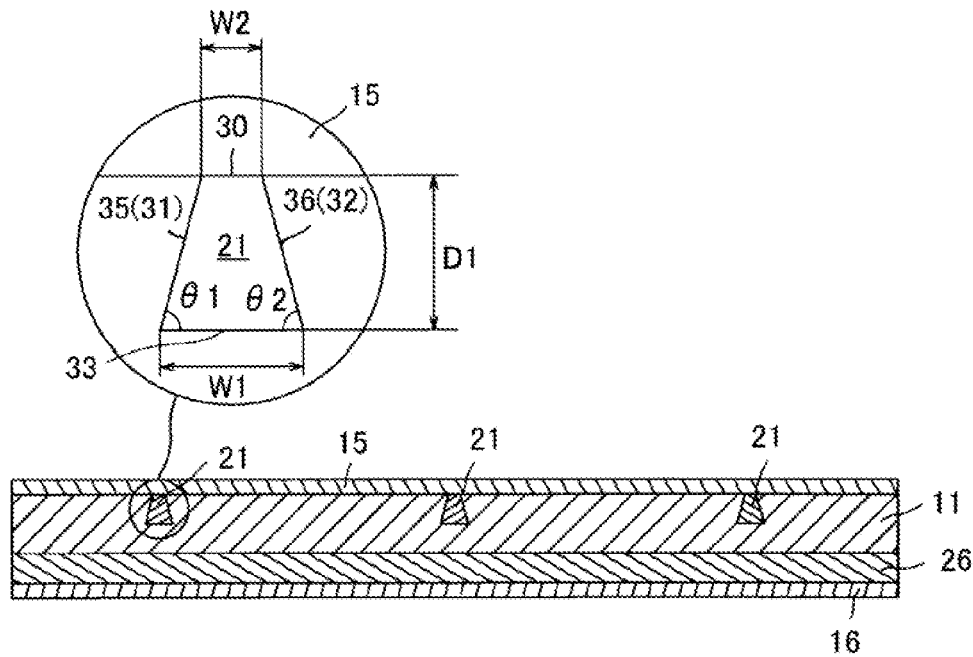
FIGS. 5A and 5B are explanatory diagrams of the touch panel of FIG. 4, where

As illustrated in an enlarged view of FIG. 5A, the first wiring line 21 has an isosceles trapezoidal cross section (a cross section perpendicular to the longitudinal direction), and includes a proximal end face 30, a side face parts 31, 32, and a distal end face 33 (first end) located in this order from the first substrate 15 side.

Note that in the following description for the first wiring line 21, the first redundant line 22, a second wiring line 26, and a second redundant line 27, a face on a side close to the substrate is also referred to as a proximal end face, and a face on a side far from the substrate is also referred to as a distal end face.

The proximal end face 30 is a region that is joined to the first substrate 15 and forms an interface. That is, the proximal end face 30 is a region that is located on an innermost side (a side far from the display device 3) of the first wiring line 21 on the basis of the first substrate 15.

The side face parts 31, 32 are regions that form side faces of the first wiring line 21, and the side face parts 31, 32 respectively include at least inclined surfaces 35, 36.

The inclined surfaces 35, 36 are regions that are inclined in directions intersecting with the proximal end face 30, and the inclined surfaces 35, 36 are separated from each other from the proximal end face 30 side toward the distal end face 33 side. That is, in the first wiring line 21, the cross-sectional area perpendicular to the thickness direction is gradually increased from the proximal end face 30 side toward the distal end face 33 side. From another point of view, a cross-sectional shape of the first wiring line 21 can also be said to be a reverse tapered shape with respect to the first substrate 15. That is, the first wiring line 21 has a line width varied according to the height.

Moreover, the inclined surfaces 35, 36 of the present embodiment are formed on the entire side face parts 31, 32 from the proximal end face 30 to the distal end face 33.

An angle θ1 formed between the distal end face 33 and the inclined surface 35 and an angle θ2 formed between the distal end face 33 and the inclined surface 36 illustrated in FIG. 5A are each preferably 25° or more, and more preferably 30° or more.

When the angles θ1, θ2 each fall within this range, it is possible to suppress visibility of the first wiring line 21 from the user side owing to reflection of light (ambient light) from the user side by the inclined surfaces 35, 36. Thus, the appearance of the displaying unit 1 improves.

Moreover, the angles θ1, θ2 of the inclined surfaces 35, 36 are each preferably 80° or less, and more preferably 70° or less.

When the angles θ1, θ2 each fall within this range, it is possible to suppress shielding of the inclined surfaces 35, 36 against light from the display device 3 side. As a result, it is possible to prevent reduction in luminance of the display device 3 and to suppress visibility of the first wiring line 22 from the user side. Thus, the appearance of the displaying unit 1 improves.

Note that in the present embodiment, the angles θ1, θ2 of the inclined surfaces 35, 36 are each 60°.

The distal end face 33 is a region that faces the proximal end face 30, and is a region located on an outermost side (the lower side in FIGS. 5A and 5B) of the first wiring line 21 on the basis of the first substrate 15.

A line width W1 of the distal end face 33 is larger than a line width W2 of the proximal end face 30, preferably 1.1 times or more and three times or less the line width W2 of the proximal end face 30, and more preferably 1.2 times or more and twice or less the line width W2 of the proximal end face 30.

Moreover, a thickness D1 (the distance from the proximal end face 30 to the distal end face 33) of the first wiring line 21 illustrated in the enlarged view of FIG. 5A is preferably 0.5 μm or more, and more preferably 0.8 μm or more in view of ensuring a sufficient conductive path.

The thickness D1 of the first wiring line 21 is preferably 2 μm or less, and more preferably 1.5 μm or less in view of suppressing reflection of light from the display device 3 by the side face parts 31, 32.

Note that in the present embodiment, the thickness D1 of the first wiring line 21 is approximately 1 μm.

Figure 6A:
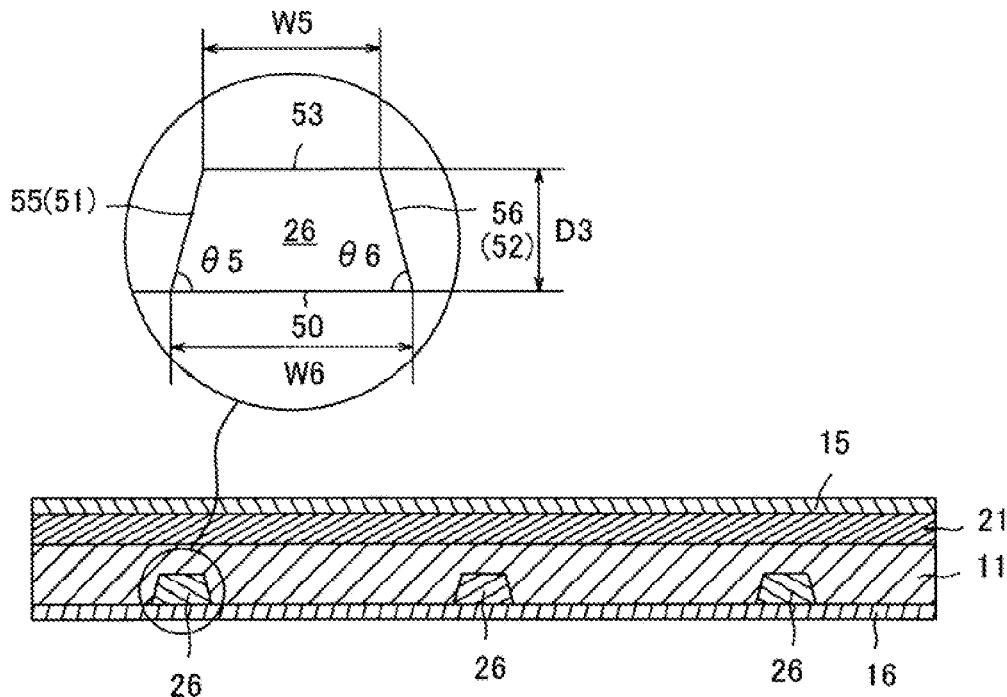
FIGS. 6A and 6B are explanatory diagrams of the touch panel of FIG. 4, where
Figure 6B:
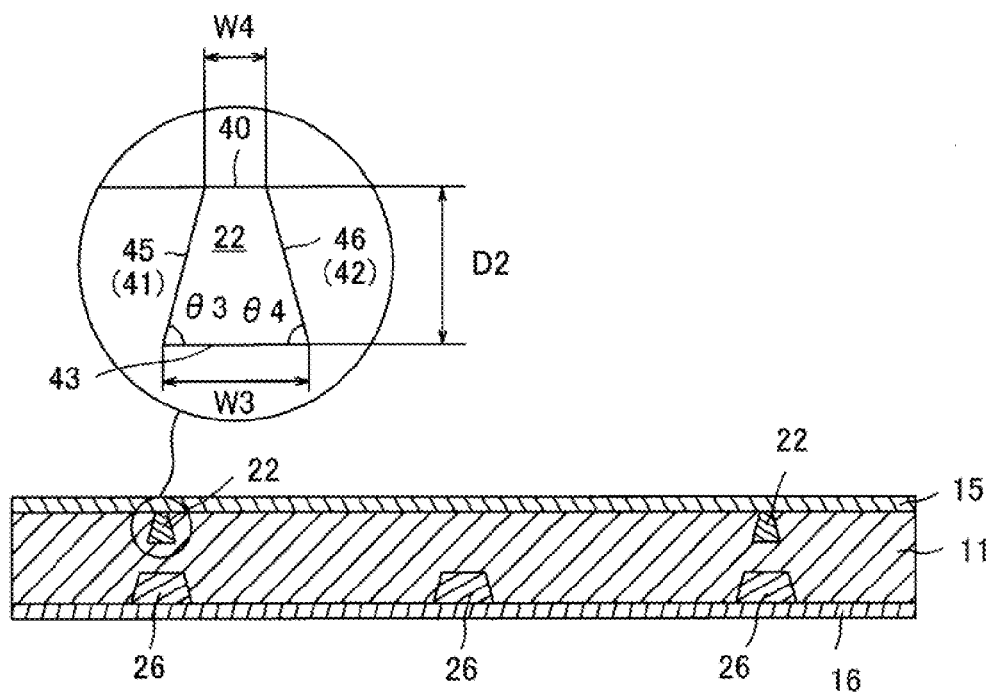

As illustrated in an enlarged view of FIG. 6B, the first redundant line 22 has substantially the same shape as the first wiring line 21. That is, the first redundant line 22 includes a proximal end face 40, side face parts 41, 42, and a distal end face 43 located in this order from the first substrate 15 side.

The proximal end face 40 is a region that is joined to the first substrate 15 and forms an interface, and is a region that is located on an innermost side of the first redundant line 22 on the basis of the first substrate 15.

The side face parts 41, 42 are regions that form side faces of the first redundant line 22, and the side face parts 41, 42 respectively include at least inclined surfaces 45, 46.

The inclined surfaces 45, 46 are inclined in directions intersecting with the proximal end face 40 and separated from each other from the proximal end face 40 side toward the distal end face 43 side.

Moreover, the inclined surfaces 45, 46 of the present embodiment each have a reverse tapered shape and are formed on the entire side face parts 41, 42 from the proximal end face 40 to the distal end face 43.

An angle θ3 formed between the distal end face 43 and the inclined surface 45 and an angle θ4 formed between the distal end face 43 and the inclined surface 46 illustrated in FIG. 6B are each preferably 25° or more, and more preferably 30° or more.

When the angles θ3, θ4 each fall within this range, it is possible to suppress visibility of the first redundant line 22 from the user side owing to reflection of light (ambient light) from the user side by the inclined surfaces 45, 46. Thus, the appearance of the displaying unit 1 improves.

Moreover, the angles θ3, θ4 of the inclined surfaces 45, 46 are each preferably 80° or less, and more preferably 70° or less.

When the angles θ3, θ4 each fall within this range, it is possible to suppress shielding of the inclined surfaces 45, 46 against light from the display device 3 side. As a result, it is possible to prevent reduction in luminance of the display device 3 and to suppress visibility of the first redundant line 22 from the user side. Thus, the appearance of the displaying unit 1 improves.

Note that in the present embodiment, the angles θ3, θ4 of the inclined surfaces 45, 46 are each 60°.

The distal end face 43 is a region that faces the proximal end face 40, and is a region located on an outermost side of the first redundant line 22 on the basis of the first substrate 15.

A line width W3 of the distal end face 43 is preferably larger than a line width W4 of the proximal end face 40, more preferably 1.1 times or more and three times or less the line width W4 of the proximal end face 40, and further preferably 1.2 times or more and twice or less the line width W4 of the proximal end face 40.

Moreover, a thickness D2 (the distance from the proximal end face 40 to the distal end face 43) of the first redundant line 22 is preferably 0.5 μm or more, and more preferably 0.8 μm or more in view of ensuring a sufficient conductive path.

The thickness D2 of the first redundant line 22 is preferably 2 μm or less, and more preferably 1 μm or less in view of suppressing reflection of light from the display device 3 by the side face parts 41, 42.

In the present embodiment, the thickness D2 of the first redundant line 22 is substantially the same as the thickness D1 of the first wiring line 21.

As for the dielectric member 11 which connects the first electrode part 10 and the second electrode part 12 to each other, the dielectric member 11 is a member that has transparency and has superiority in dielectricity over conductivity.

A relative dielectric constant of the dielectric member 11 is preferably 2 or more and 4 or less in a normal state.

Moreover, as illustrated in FIG. 4, the dielectric member 11 has a plate-like or film-like shape, and has an adhesive property or adhesiveness.

The dielectric member 11 may be a plate-like or film-like body provided with a film-like or plate-like adhesive having a surface provided with an adhesion function, or may be formed by solidifying a fluid adhesive in a film-like or plate-like shape.

Moreover, a refractive index of the dielectric member 11 is appropriately set depending on, for example, a material of the first substrate 15 or a second substrate 16, and preferably from 1.40 to 1.60.

In the present embodiment, an optical clear adhesive film (OCA film) having a refractive index of 1.48 is employed, and the film has adhesive parts on both faces thereof.

An average thickness of the dielectric member 11 is preferably 10 μm or more in view of reliably preventing electric conduction between the first electrode part 10 and the second electrode part 12, and more preferably 20 μm or more in view of suppressing influence of, for example, noise.

Moreover, the average thickness of the dielectric member 11 is preferably 120 μm or less in view of accurately sensing capacitance in the second electrode part 12, and more preferably 100 μm or less in view of reliably sensing capacitance in the second electrode part 12.

Figure 7B:
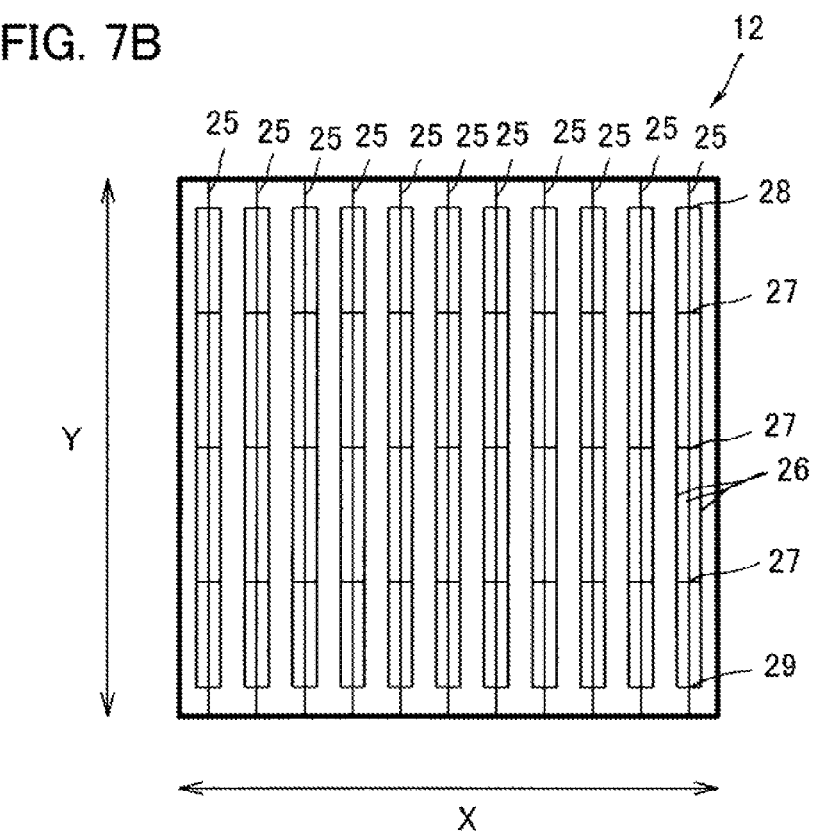

As illustrated in FIG. 4, the second electrode part 12 includes a plurality of second electrode groups 25 which is spread in a planar form and distributed on the second substrate 16 (substrate). As illustrated in FIG. 7B, in the second electrode part 12, the respective second electrode groups 25 are arranged in parallel at a predetermined interval in the transverse direction X (the direction perpendicular to both the lengthwise direction Y and a thickness direction). Moreover, the respective second electrode groups 25 are parallel to each other.

The second substrate 16 is a transparent substrate that supports the second electrode groups 25, and is a plate-like or film-like insulating substrate.

The second substrate 16 is not particularly limited as long as it has an insulating property. For example, an insulating substrate made of a transparent material such as glass, polyester, polyethylene terephthalate (PET), polycarbonate, polymethyl methacrylate, and polyethylene naphthalate can be employed.

A refractive index of the second substrate 16 is preferably from 1.40 to 1.70.

As with the first substrate 15, the second substrate 16 of the present embodiment employs a PET film, and a refractive index thereof is approximately 1.58. That is, the refractive index of the second substrate 16 is larger than the refractive index of the dielectric member 11.

As illustrated in FIG. 7B, each of the second electrode groups 25 includes at least one second wiring line 26.

Although the number of second wiring lines 26 constituting each of the second electrode groups 25 is not particularly limited, the number of the second wiring lines 26 is preferably two or more, and more preferably three or more.

Due to the second electrode group 25 formed of the plurality of second wiring lines 26, sensing of capacitance in response to an operation by a user becomes more accurate. Moreover, since the respective second wiring lines 26 are electrically connected in parallel, wiring resistance reduces and a response speed improves.

On the other hand, when the second electrode group 25 includes a too large number of the second wiring lines 26, the second electrode group 25 shields light from the display device 3, luminance of the display device 3 reduces, and the second wiring lines 26 are visible from the user side. As a result, the appearance becomes poor. Thus, although depending on a size of the display device 3, the number of the second wiring lines 26 constituting each of the second electrode groups 25 is preferably 50 or less, more preferably 20 or less, and further preferably 10 or less.

Note that although in the present embodiment, each of the second electrode groups 25 actually includes the nineteen second wiring lines 26, in each of the drawings, only the three second wiring lines 26 are illustrated for each of the second electrode groups 25 in order to facilitate understanding.

As illustrated in FIG. 7B, the second electrode group 25 includes the plurality of second wiring lines 26. Further, the second electrode group 25 includes a second redundant line 27 and second connection parts 28, 29, which connect the adjacent second wiring lines 26, 26.

Each of the second wiring lines 26 is a region that has a function of sensing an operation position of a user. Each of the second wiring lines 26 is conductive wire linearly extending in the lengthwise direction Y. The respective second wiring lines 26 are aligned in parallel at a predetermined interval in the transverse direction X.

The second wiring line 26 is not particularly limited as long as it is a conductor. For example, as with the first wiring line 21, the second wiring line 26 can be formed of metal such as copper, silver, gold, platinum, aluminum, and chrome, a metal alloy of these metals, or a metal complex of these metals.

In the present embodiment, the second wiring line 26 is formed of copper which is a colored metal, and the second wiring line 26 has a certain thickness or more, and is opaque.

A non-conductor component content in the second wiring line 26 is preferably 0% or more and 10% or less of all components, and more preferably 2% or less in view of further reduction in resistance.

The second connection parts 28, 29 are regions that connect ends of the adjacent second wiring lines 26, 26, and are regions that electrically connect the respective second wiring lines 26 in parallel.

The second redundant line 27 is conductive wire that extends in a direction intersecting with the second wiring line 26, and the second redundant line 27 connects intermediate parts of the adjacent second wiring lines 26, 26.

The second redundant line 27 of the present embodiment is perpendicular to the second wiring line 26 and extends in the transverse direction X.

The second redundant line 27 is not particularly limited as long as it is a conductor. For example, the second redundant line 27 can be formed of metal such as copper, silver, gold, platinum, aluminum, and chrome, a metal alloy of these metals, or a metal complex of these metals.

In the present embodiment, the second redundant line 27 is formed of the same material as the second wiring line 26.

Here, a cross-sectional shape of each region of the second electrode group 25 will be described.

As illustrated in an enlarged view of FIG. 6A, the second wiring line 26 has a shape formed by turning the first wiring line 21 upside down, and has an isosceles trapezoidal cross section (a cross section perpendicular to the longitudinal direction).

The second wiring line 26 includes a proximal end face 50, side face parts 51, 52, and a distal end face 53 located in this order from the second substrate 16 side.

The proximal end face 50 is a region that is joined to the second substrate 16 and forms an interface, and is a region that is located on an innermost side (a side close to the display device 3) of the second wiring line 26 on the basis of the second substrate 16.

The side face parts 51, 52 are regions that form side faces of the second wiring line 26, and the side face parts 51, 52 respectively include at least inclined surfaces 55, 56.

The inclined surfaces 55, 56 are regions that are inclined in directions intersecting with the proximal end face 50, and the inclined surfaces 55, 56 come close to each other from the proximal end face 50 side toward the distal end face 53 side. That is, in the second wiring line 26, the cross-sectional area perpendicular to the thickness direction is gradually decreased from the proximal end face 50 side toward the distal end face 53 side.

From another point of view, a cross-sectional shape of the second wiring line 26 can also be said to be a tapered shape. That is, the second wiring line 26 has a line width varied according to the height.

Moreover, the inclined surfaces 55, 56 of the present embodiment are formed on the entire side face parts 51, 52 from the proximal end face 50 to the distal end face 53. That is, each of angles formed between the distal end face 53 and the inclined surfaces 55, 56 is an obtuse angle. In other words, each of corners formed between the distal end face 53 and the side face parts 51, 52 is gentler than each of corners formed when the end face 53 is perpendicular to the side face parts 51, 52 (when each of angles formed between the distal end face 53 and the side face parts 51, 52 is) 90°.

An angle θ5 formed between the proximal end face 50 and the inclined surface 55 and an angle θ6 formed between the proximal end face 50 and the inclined surface 56 are each preferably 25° or more, and more preferably 30° or more.

When the angles θ5, θ6 each fall within this range, it is possible to suppress visibility of the second wiring line 26 from the user side owing to reflection of light (ambient light) from the user side by the inclined surfaces 55, 56. Thus, the appearance of the displaying unit 1 improves.

Moreover, the angles θ5, θ6 of the inclined surfaces 55, 56 are each preferably 80° or less, and more preferably 70° or less.

When the angles θ5, θ6 each fall within this range, it is possible to suppress shielding of the inclined surfaces 55, 56 against light from the display device 3 side. As a result, it is possible to prevent reduction in luminance of the display device 3 and to suppress visibility of the second wiring line 26 from the user side. Thus, the appearance of the displaying unit 1 improves.

Moreover, the angles θ5, θ6 of the inclined surfaces 55, 56 are preferably the same as the angles θ3, θ4 (see FIG. 6B) of the inclined surfaces 45, 46 of the first redundant line 22, respectively or fall within the range of ±5% of the angles θ3, θ4, respectively.

Note that in the present embodiment, the angles θ5, θ6 of the inclined surfaces 55, 56 are each 60° and are the same as the angles θ3, θ4 (see FIG. 6B) of the inclined surfaces 45, 46 of the first redundant line 22, respectively.

The distal end face 53 is a region that faces the proximal end face 50, and is a region located on an outermost side of the second wiring line 26 on the basis of the second substrate 16.

A line width W6 of the proximal end face 50 is preferably larger than a line width W5 of the distal end face 53, more preferably 1.1 times or more and three times or less the line width W5 of the distal end face 53, and further preferably 1.2 times or more and twice or less the line width W5 of the distal end face 53.

Moreover, a thickness D3 (the distance from the proximal end face 50 to the distal end face 53) of the second wiring line 26 is preferably 0.3 μm or more, and more preferably 0.5 μm or more in view of ensuring a sufficient conductive path.

The thickness D3 of the second wiring line 26 is preferably 1.5 μm or less, and more preferably 1.2 μm or less in view of suppressing reflection of light from the display device 3 by the side face parts 51, 52.

Note that, in the present embodiment, the thickness D3 of the second wiring line 26 is thinner than the thickness D1 (see FIG. 5A) of the first wiring line 21 and the thickness D2 (see FIG. 6B) of the first redundant line 22 in order to make resistivity of the second wiring line 26 substantially the same as resistivity of the first wiring line 21. Specifically, the thickness D3 of the second wiring line 26 is approximately 0.8 μm.

Figure 5B:
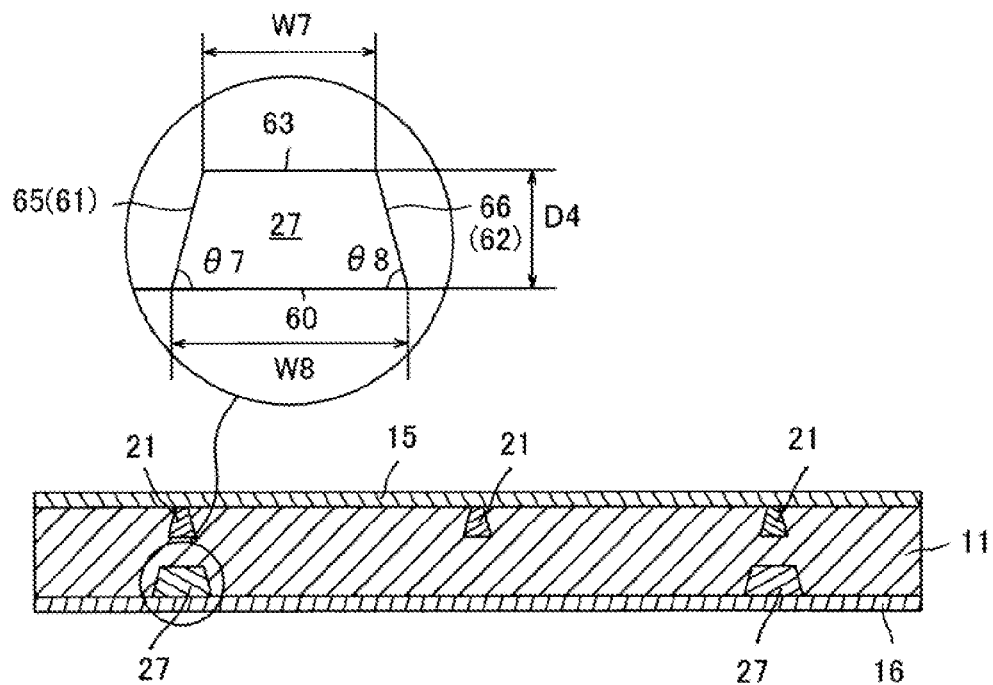

As illustrated in an enlarged view of FIG. 5B, the second redundant line 27 has substantially the same shape as the second wiring line 26 and includes a proximal end face 60, side face parts 61, 62, and a distal end face 63 located in this order from the second substrate 16 side.

The proximal end face 60 is a region that is located on an innermost side of the second redundant line 27 on the basis of the second substrate 16.

The side face parts 61, 62 are regions that form side faces of the second redundant line 27, and the side face parts 61, 62 respectively include at least inclined surfaces 65, 66.

The inclined surfaces 65, 66 are regions that are inclined in directions intersecting with the proximal end face 60, and the inclined surfaces 65, 66 come close to each other from the proximal end face 60 side toward the distal end face 63 side.

Moreover, the inclined surfaces 65, 66 of the present embodiment each have a tapered shape and are formed on the entire side face parts 61, 62 from the proximal end face 60 to the distal end face 63.

An angle θ7 formed between the proximal end face 60 and the inclined surface 65 and an angle θ8 formed between the proximal end face 60 and the inclined surface 66 are each preferably 25° or more, and more preferably 30° or more.

When the angles θ7, θ8 each fall within this range, it is possible to suppress visibility of the second redundant line 27 from the user side owing to reflection of light (ambient light) from the user side by the inclined surfaces 65, 66. Thus, the appearance of the displaying unit 1 improves.

Moreover, the angles θ7, θ8 of the inclined surfaces 65, 66 are each preferably 80° or less, and more preferably 70° or less.

When the angles θ7, θ8 each fall within this range, it is possible to suppress shielding of the inclined surfaces 65, 66 against light from the display device 3 side. As a result, it is possible to prevent reduction in luminance of the display device 3 and to suppress visibility of the second redundant line 27 from the user side. Thus, the appearance of the displaying unit 1 improves.

Moreover, the angles θ7, θ8 of the inclined surfaces 65, 66 are preferably the same as the angles θ1, θ2 (see FIG. 5A) of the inclined surfaces 35, 36 of the first wiring line 21, respectively or fall within the range of ±5% of the angles θ1, θ2, respectively.

Note that in the present embodiment, the angles θ7, θ8 of the inclined surfaces 65, 66 are each 60° and are the same as the angles θ1, θ2 (see FIG. 5A) of the inclined surfaces 35, 36 of the first wiring line 21, respectively.

As illustrated in FIG. 5B, the distal end face 63 is a region that faces the proximal end face 60, and is a region that is located on an outermost side of the second redundant line 27 on the basis of the second substrate 16.

A line width W8 of the proximal end face 60 is preferably larger than a line width W7 of the distal end face 63, more preferably 1.1 times or more and three times or less the line width W7 of the distal end face 63, and further preferably 1.2 times or more and twice or less the line width W7 of the distal end face 63.

Moreover, a thickness D4 (the distance from the proximal end face 60 to the distal end face 63) of the second redundant line 27 is preferably 0.5 μm or more, and more preferably 0.8 μm or more in view of ensuring a sufficient conductive path.

The thickness D4 of the second redundant line 27 is preferably 2 μm or less, and more preferably 1.5 μm or less in view of suppressing reflection of light from the display device 3 by the side face parts 61, 62.

The thickness D4 of the second redundant line 27 of the present embodiment is substantially the same as the thickness D3 of the second wiring line 26 and thinner than the thickness D1 of the first wiring line 21.

Here, a positional relationship between respective regions of the touch panel 2 will be described.

As illustrated in FIG. 3, the touch panel 2 has a laminate structure in which the dielectric member 11 is interposed between the first electrode part 10 and the second electrode part 12.

That is, as illustrated in FIG. 4, the first electrode groups 20, the dielectric member 11, and the second electrode groups 25 are interposed in this order in the thickness direction (lamination direction) between the first substrate 15 and the second substrate 16.

In plan view, the first wiring line 21 intersects with the second wiring line 26, and the first redundant line 22 intersects with the second redundant line 27. In the present embodiment, the first wiring line 21 is perpendicular to the second wiring line 26, and the first redundant line 22 is perpendicular to the second redundant line 27.

In the present embodiment, as described below, a positional relationship between the first wiring line 21 and the second redundant line 27 is basically the same as a positional relationship between the first redundant line 22 and the second wiring line 26.

Figure 8:
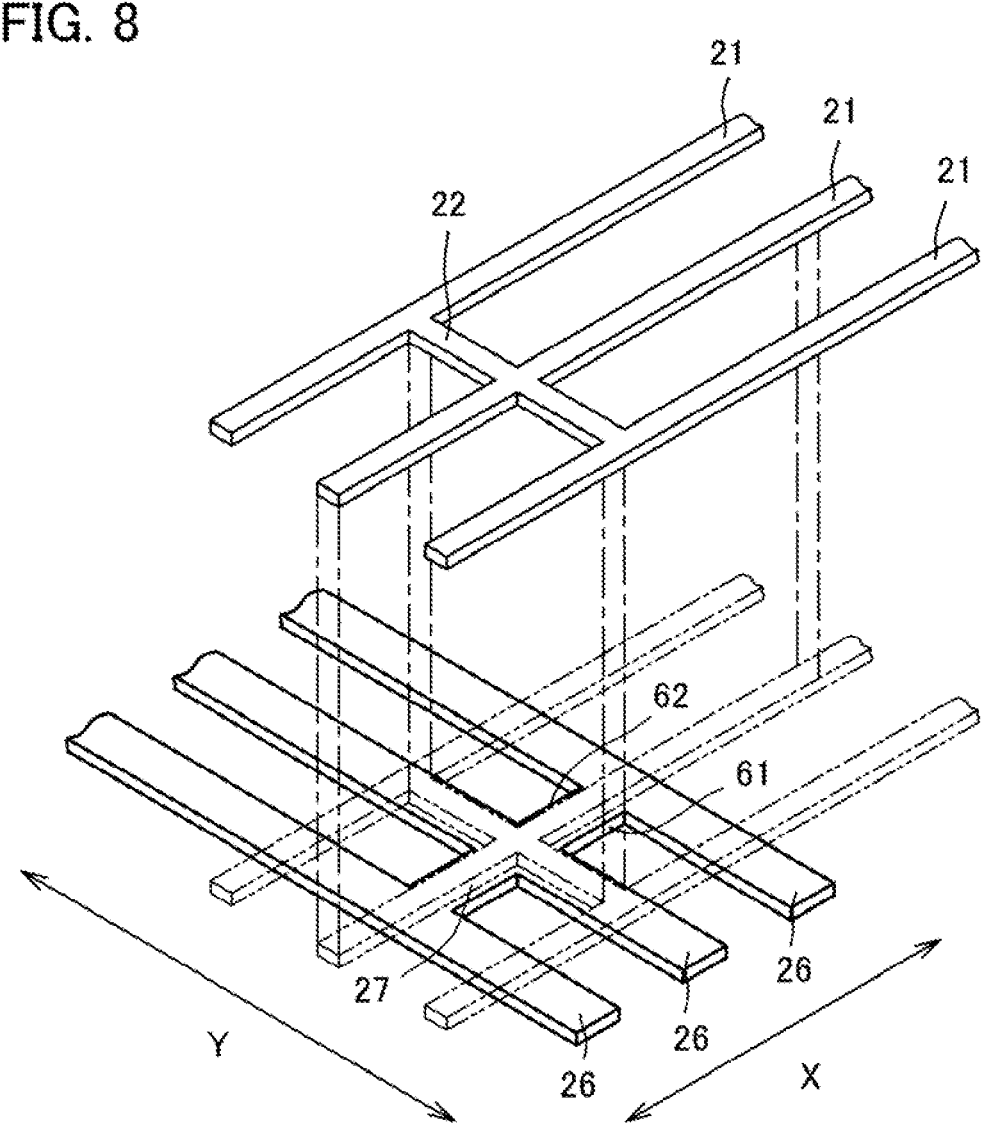
FIG. 8 is an explanatory diagram illustrating the principal part of the touch panel of FIG. 4, and is a perspective view schematically illustrating a positional relationship between a first electrode group and a second electrode group.

As illustrated in FIG. 8, the first wiring line 21 overlaps the second redundant line 27 in the thickness direction. As illustrated in FIG. 5B, the side face parts 31, 32 of the first wiring line 21 are located on an inner side (central side) of the side face parts 61, 62 of the second redundant line 27. That is, the first wiring line 21 fits within a projection plane in the thickness direction of the second redundant line 27.

The maximum line width W1 of the first wiring line 21 illustrated in FIG. 5A is preferably the same as or smaller than the maximum line width W8 of the second redundant line 27 illustrated in FIG. 5B.

Specifically, the maximum line width W1 of the first wiring line 21 is preferably 50% or more and 100% or less of the maximum line width W8 of the second redundant line 27, and more preferably 75% or more and 90% or less of the maximum line width W8 of the second redundant line 27.

When the maximum line width W1 of the first wiring line 21 falls within this range, sufficient electric conduction as the first wiring line 21 is ensured, while the first wiring line 21 is less prone to obstruct an optical path of light passing near the second redundant line 27.

Similarly, as illustrated in FIG. 8, the first redundant line 22 overlaps the second wiring line 26 in the thickness direction. As illustrated in FIG. 6B, the side face parts 41, 42 of the first redundant line 22 are located on an inner side (central side) of the side face part 51, 52 of the second wiring line 26. That is, the first redundant line 22 fits within a projection plane in the thickness direction of the second wiring line 26.

The maximum line width W3 of the first redundant line 22 illustrated in FIG. 6B is preferably the same as or smaller than the maximum line width W6 of the second wiring line 26 illustrated in FIG. 6A.

Specifically, the maximum line width W3 of the first redundant line 22 is preferably 50% or more and 100% or less of the maximum line width W6 of the second wiring line 26, and more preferably 75% or more and 90% or less of the maximum line width W6 of the second wiring line 26.

When the maximum line width W3 of the first redundant line 22 falls within this range, sufficient electric conduction as the first redundant line 22 is ensured, while the first redundant line 22 is less prone to obstruct an optical path of light passing near the second wiring line 26.

Next, the display device 3 will be described.

Figure 9:
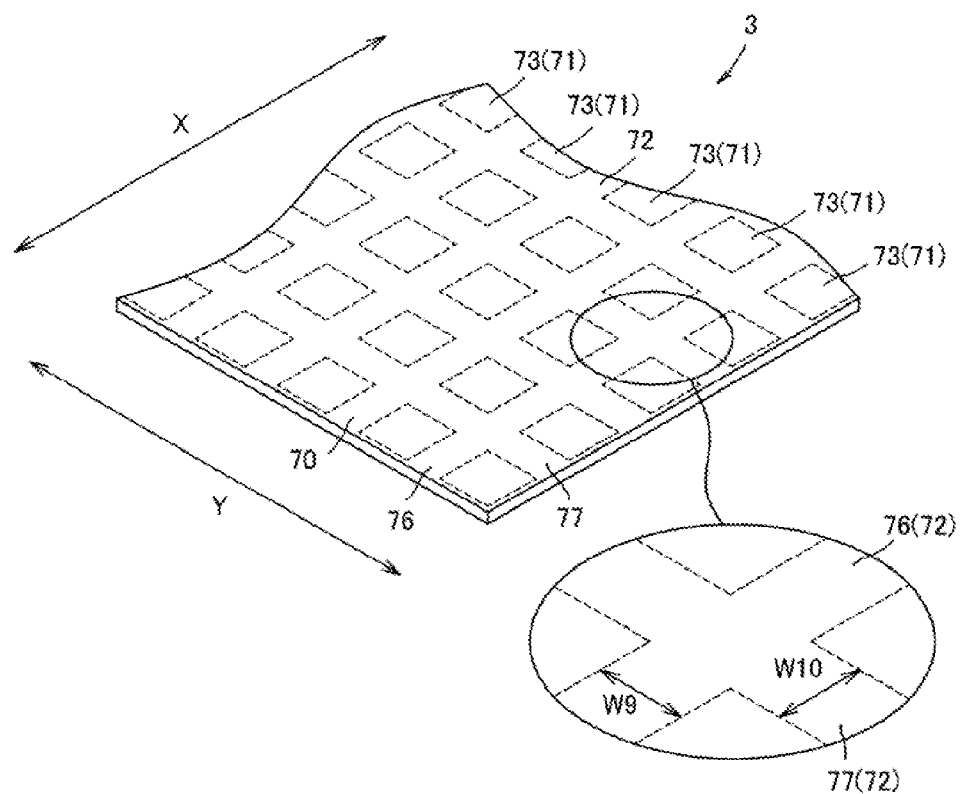
FIG. 9 is a perspective view schematically illustrating a part of a display device of FIG. 2.

As illustrated in FIG. 9, the display device 3 has at least one face including a display surface 70 which displays a desired image, character or the like.

The display surface 70 includes a pixel part 71 and a light-shielding part 72.

The pixel part 71 is a region capable of displaying desired color information. The pixel part 71 is formed of sub-pixel parts 73 which emit light of monochromatic color such as red (R), green (G), and blue (B) and are arranged in a lattice form.

The light-shielding part 72 is a region arranged so as to partition the sub-pixel parts 73, and is a grid-like region. Moreover, the light-shielding part 72 is a region that shields a part between the respective sub-pixel parts 73 from light, and is a region that is colored a predetermined color such as black and white.

The light-shielding part 72 of the present embodiment is colored black and is a so-called black matrix.

As illustrated in FIG. 9, the light-shielding part 72 is formed of a first light-shielding part 76 and a second light-shielding part 77.

The first light-shielding part 76 is a region that linearly extends in the transverse direction X, and is a region that partitions the respective sub-pixel parts 73 in the lengthwise direction Y.

A width W9 of the first light-shielding part 76 illustrated in FIG. 9 is larger than the maximum line width W1 of the first wiring line 21 (the width of the distal end face 33 of FIG. 5A) and larger than the maximum line width W8 of the second redundant line 27 (the width of the proximal end face 60 of FIG. 5B). The width W9 of the first light-shielding part 76 is preferably 1.2 times or more and twice or less the maximum line width W8 of the second redundant line 27.

The second light-shielding part 77 is a region that linearly extends in the lengthwise direction Y, and is a region that partitions the respective sub-pixel parts 73 in the transverse direction X.

A width W10 of the second light-shielding part 77 illustrated in FIG. 9 is larger than the maximum line width W3 of the first redundant line 22 (the width of the distal end face 43 of FIG. 6B) and larger than the maximum line width W6 of the second wiring line 26 (the width of the proximal end face 50 of FIG. 6A). The width W10 of the second light-shielding part 77 is preferably 1.2 times or more and twice or less the line width W6 of the second wiring line 26.

Next, a positional relationship between respective constituent members of the displaying unit 1 will be described.

As illustrated in FIG. 2, the touch panel 2 is arranged so as to cover the display surface 70 of the display device 3.

Figure 10:
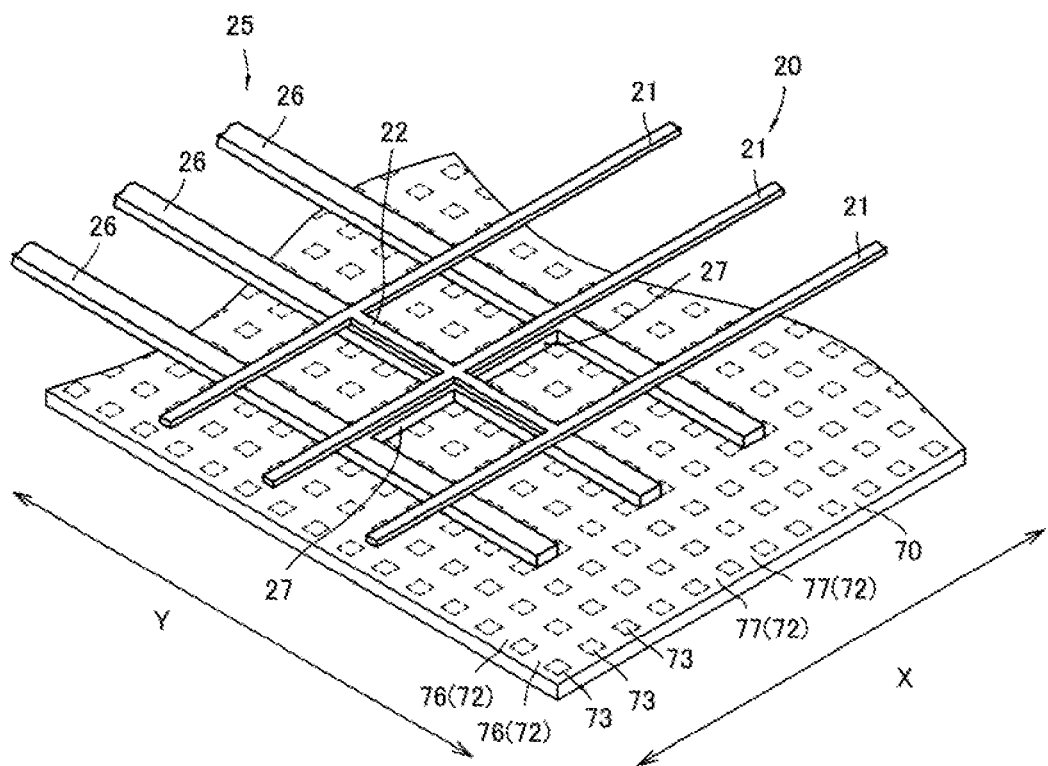
FIG. 10 is an explanatory diagram illustrating a positional relationship among a display surface of the display device, the first electrode group, and the second electrode group in the first embodiment of the present invention.

As can be seen from FIGS. 5A, 5B, and 10, a projection plane in the thickness direction of the first light-shielding part 76 is covered with the proximal end face 60 of the second redundant line 27. Moreover, as can be seen from FIGS. 6A, 6B and 10, a projection plane in the thickness direction of the second light-shielding part 77 is covered with the proximal end face 50 of the second wiring line 26.

As illustrated in FIG. 10, a part of the first wiring line 21 overlaps the second redundant line 27 and further overlaps the first light-shielding part 76. Moreover, the entire line width of the first wiring line 21 overlaps the second redundant line 27, and the entire line width of the second redundant line 27 overlaps the first light-shielding part 76. That is, the entire line width of the first wiring line 21 overlaps the first light-shielding part 76.

Moreover, from another point of view, when the first wiring line 21, the second redundant line 27, and the first light-shielding part 76 are projected on a plane parallel to the display surface 70 of the display device 3, a part of the first wiring line 21 is located on an inner side (central side) of an outer edge of the second redundant line 27. Moreover, the second redundant line 27 is located on an inner side of an outer edge (a boundary region with respect to the sub-pixel parts 73) of the first light-shielding part 76.

As illustrated in FIG. 10, a part of the first redundant line 22 overlaps the second wiring line 26, and the second wiring line 26 overlaps the second light-shielding part 77. Moreover, the entire line width of the first redundant line 22 overlaps the second wiring line 26, and the entire line width of the second wiring line 26 overlaps the second light-shielding part 77. That is, the entire line width of the first redundant line 22 overlaps the second light-shielding part 77.

Moreover, from another point of view, when the first redundant line 22, the second wiring line 26, and the second light-shielding part 77 are projected on the plane parallel to the display surface 70 of the display device 3, a part of the first redundant line 22 is located on an inner side (central side) of an outer edge of the second wiring line 26. Moreover, the second wiring line 26 is located on an inner side of an outer edge (a boundary region with respect to the sub-pixel parts 73) of the second light-shielding part 77.

In plan view of the display surface 70 of the display device 3, as illustrated in FIG. 10, the three sub-pixel parts 73 are located between the adjacent first wiring lines 21, 21, and the six sub-pixel parts 73 are located between the adjacent first redundant lines 22, 22. The three sub-pixel parts 73 are located between the adjacent second wiring lines 26, 26, and the six sub-pixel parts 73 are located between the adjacent second redundant lines 27, 27. In the first wiring line 21 of the first electrode group 20, there exist a location where the first wiring line 21 overlaps the second redundant line 27 and a location where the first wiring line 21 does not overlap the second redundant line 27. In the second wiring line 26 of the second electrode group 25, there exist a location where the second wiring line 26 overlaps the first redundant line 22 and a location where the second wiring line 26 does not overlap the first redundant line 22.

Next, a method for manufacturing the displaying unit 1 will be described. In particular, the touch panel 2 which is one of the aspects of the present invention will be mainly described.

Method for Manufacturing Touch Panel 2 by Using Semi-Additive Method

First, a method for manufacturing the touch panel 2 will be described.

In the method for manufacturing the touch panel 2 of the present embodiment, the first electrode group 20 is formed on the first substrate 15 by using a semi-additive method (first electrode group forming step (electrode group forming step)).

Figure 11A:
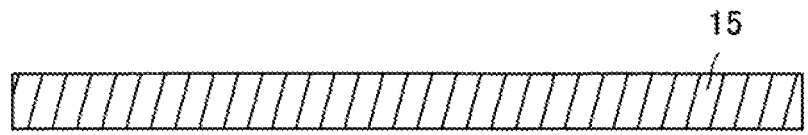
FIGS. 11A to 11E are explanatory diagrams of a method for manufacturing the touch panel of the first embodiment of the present invention, and illustrate sectional views in respective manufacturing steps of a first electrode group forming step.
Figure 11B:
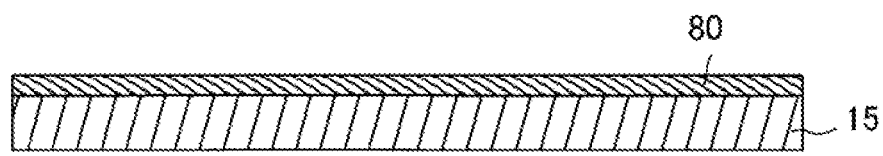

In the first electrode group forming step, a base layer forming step of forming a base layer 84 on the first substrate 15 is first performed. Specifically, as illustrated in FIGS. 11A and 11B, a metal catalyst is applied to one face of the first substrate 15 to form a seed layer 80 (seed layer forming step).

At this time, the seed layer 80 is formed on the entire face of the first substrate 15.

An average film thickness of the seed layer 80 formed at this time is preferably 1 nm or more and 100 nm or less.

For example, palladium can be employed for the metal catalyst that constitutes the seed layer 80.

Figure 11C:
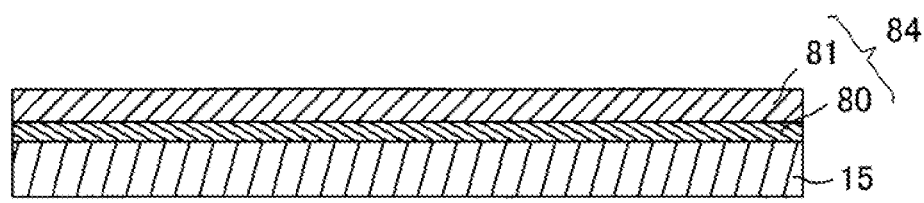

Then, as illustrated in FIG. 11C, a first plating layer 81 is formed by electroless plating on the first substrate 15 having the seed layer 80 formed thereon (hereinbelow, also referred to as a substrate, including a laminate structure) (first plating step).

At this time, the first plating layer 81 is formed on the entire face of the seed layer 80, and the base layer 84 which includes the seed layer 80 and the first plating layer 81 is formed.

An average film thickness of the first plating layer 81 formed at this time is preferably 100 nm or more and 5 μm or less.

Figure 11D:
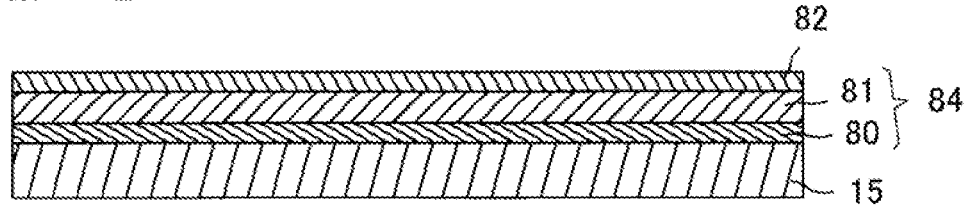

Then, as illustrated in FIG. 11D, a resist layer 82 is formed on the substrate having the base layer 84 formed thereon in the base layer forming step (resist layer forming step).

At this time, the resist layer 82 is formed on the entire face of the first plating layer 81 which forms a surface of the base layer 84.

Note that the resist layer 82 used in the present embodiment is a positive photoresist layer formed of a photosensitive resin.

Then, a through hole forming step of forming a through hole 90 having a predetermined shape on the resist layer 82 is performed.

Figure 11E:
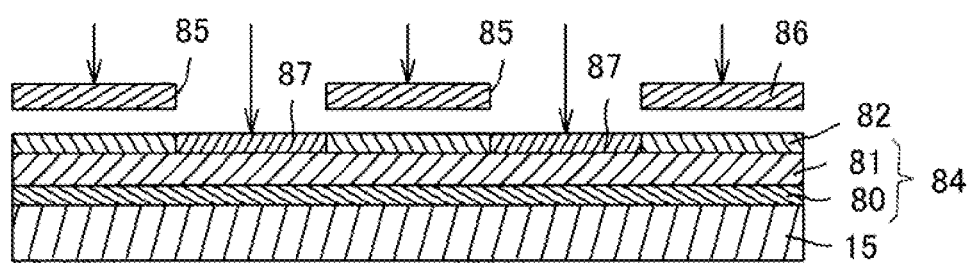

Specifically, as illustrated in FIG. 11E, a photomask 86 is arranged, and the resist layer 82 is irradiated with ultraviolet rays from an outer side of the photomask 86 (exposure step).

Note that this photomask 86 includes an opening 85 which has a desired pattern formed thereon so as to cover the resist layer 82.

At this time, the resist layer 82 is irradiated with the ultraviolet rays through the opening 85, and a part of the resist layer 82 is exposed to light to form a light-exposed part 87.

Figure 12A:
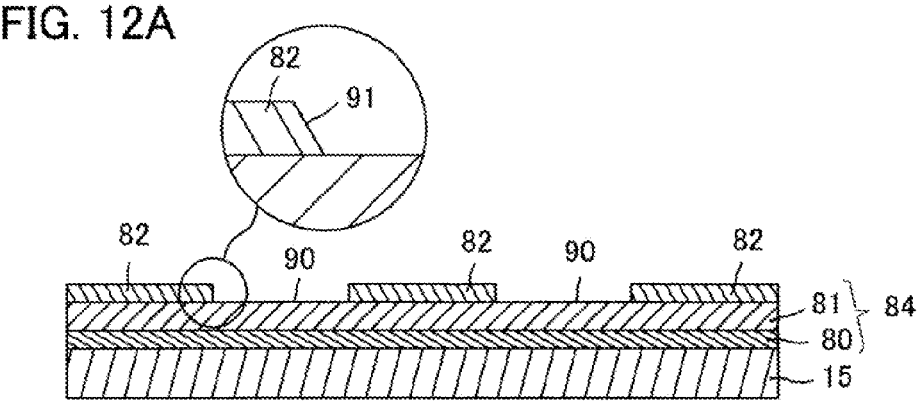
FIGS. 12A to 12D are explanatory diagrams of the method for manufacturing the touch panel of the first embodiment of the present invention, and illustrate sectional views in respective manufacturing steps of the first electrode group forming step.

Subsequently, as illustrated in FIG. 12A, the photomask 86 is removed, and development is performed to remove the light-exposed part 87 of the resist layer 82 (development step).

At this time, the through hole 90 having a predetermined pattern is formed on the resist layer 82, and a part of the first plating layer 81 is exposed through the through hole 90.

Moreover, at this time, the through hole 90 is a long groove extending in a slit-like shape, and has an inclined surface 91 formed on an inner side face thereof. That is, in a cross-sectional shape in a direction perpendicular to the extending direction of the through hole 90, an interval between inner faces is gradually varied in the thickness direction of the resist layer 82.

Figure 12B:
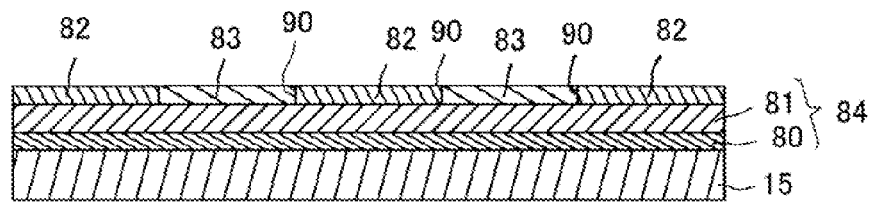

Then, as illustrated in FIG. 12B, a second plating layer 83 is formed by plating on the substrate having the through hole 90 formed thereon in the through hole forming step (second plating step).

At this time, the plating is performed by using, as a base point, a region where the first plating layer 81 serving as a base is exposed from the resist layer 82, and the second plating layer 83 (conductive layer) which is patterned in a predetermined shape is formed.

Moreover, at this time, a shape of the inclined surface 91 is reflected to form an inclined surface on a side face of the second plating layer 83. That is, the inclined surfaces 35, 36 of the first wiring line 21 and the inclined surfaces 45, 46 of the first redundant line 22 are formed.

Note that the plating performed at this time may be electroplating or electroless plating.

In the present embodiment, the second plating layer 83 is formed by electroplating.

Figure 12C:
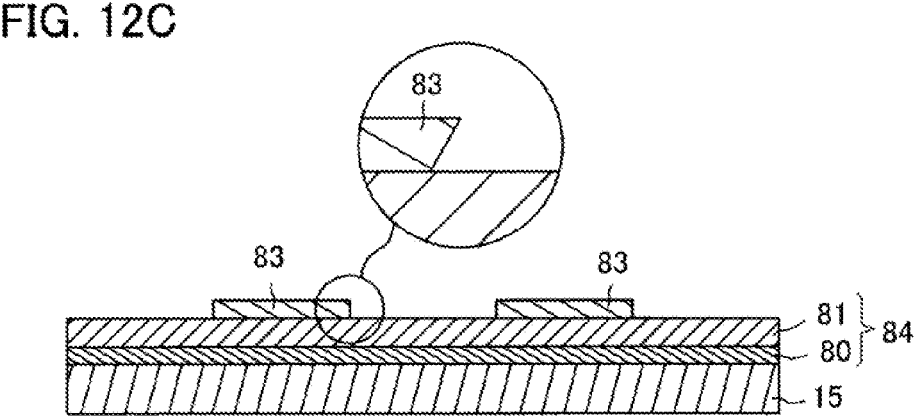
Figure 12D:
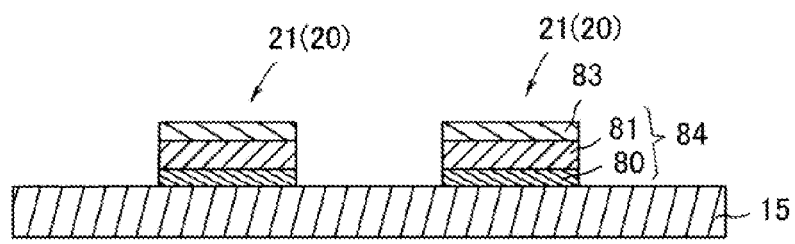

Subsequently, a resist remover is used to remove the resist layer 82 from the substrate having the second plating layer 83 formed thereon (resist removing step) as can be seen from FIGS. 12B and 12C, and the base layer 84 exposed by the removal of the resist layer 82 is removed as illustrated in FIG. 12D.

Subsequently, water-washing or the like is performed to form the desired first electrode group 20 on the first substrate 15, and the first electrode group forming step ends.

In the method for manufacturing the touch panel 2 of the present embodiment, a second electrode group forming step (electrode group forming step) of forming the second electrode group 25 on the second substrate 16 is performed by a semi-additive method in a separate step.

Since this second electrode group forming step is the same as the first electrode group forming step described above, description thereof will be omitted.

The first substrate 15 which has the first electrode group 20 mounted thereon in the first electrode group forming step and the second substrate 16 which has the second electrode group 25 mounted thereon in the second electrode group forming step are bonded to each other with the dielectric member 11 such that the first electrode group 20 and the second electrode group 25 face each other (bonding step), and the touch panel 2 is formed.

Specifically, one face of the dielectric member 11 is bonded so as to cover the second electrode group 25, and subsequently the other face of the dielectric member 11 is bonded so as to cover the first electrode group 20.

Figure 14:
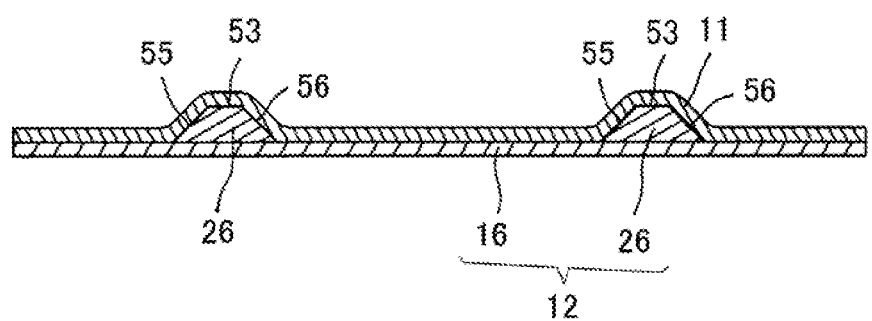
FIG. 14 is an explanatory diagram of the touch panel according to the first embodiment of the present invention, and is a sectional view when a dielectric member is bonded to the second electrode part.

At this time, since the side face parts 51, 52 of the second wiring line 26 include the inclined surfaces 55, 56 which are inclined from the distal end face 53 which abuts onto the dielectric member 11 to the proximal end face 50, the corners formed by the distal end face 53 and the inclined surfaces 55, 56 are gentle. Thus, when the adhesive part of the dielectric member 11 is bonded to the second electrode part 12, the dielectric member 11 is prone to conform with the inclined surfaces 55, 56 as illustrated in FIG. 14, and an air bubble is less prone to be incorporated between the second wiring line 26 and the adhesive part of the dielectric member 11.

Similarly, since the side face parts 61, 62 of the second redundant line 27 include the inclined surfaces 65, 66 which are inclined from the distal end face 63 which abuts onto the dielectric member 11 to the proximal end face 60, the corners formed by the distal end face 63 and the inclined surfaces 65, 66 are gentle. Thus, when the adhesive part of the dielectric member 11 is bonded, the dielectric member 11 is prone to conform with the inclined surfaces 65, 66, and an air bubble is less prone to be incorporated between the second redundant line 27 and the dielectric member 11.

In this manner, since the adhesive part of the dielectric member 11 is in close contact with the second electrode group 25 substantially with no gap therebetween, integration strength is high.

Then, the touch panel 2 is mounted on the display device 3 manufactured in a separate step, and the touch panel 2 and the display device 3 are bonded to each other with an adhesive (not illustrated).

At this time, as illustrated in FIG. 10, the respective electrode groups 20, 25 of the touch panel 2 are arranged so as to overlap the light-shielding part 72 of the display device 3 in the thickness direction. That is, the first wiring line 21 and the second redundant line 27 are located above the first light-shielding part 76, and the second wiring line 26 and the first redundant line 22 are located above the second light-shielding part 77.

The displaying unit 1 of the present embodiment can be manufactured through the above steps.

Next, an internal structure of the display device 3 of the present embodiment will be described with reference to FIG. 13.

The display device 3 is a liquid crystal display employing a so-called thin-film transistor (TFT) system, and is formed of a liquid crystal part 100 and a light source part 101.

Figure 13:
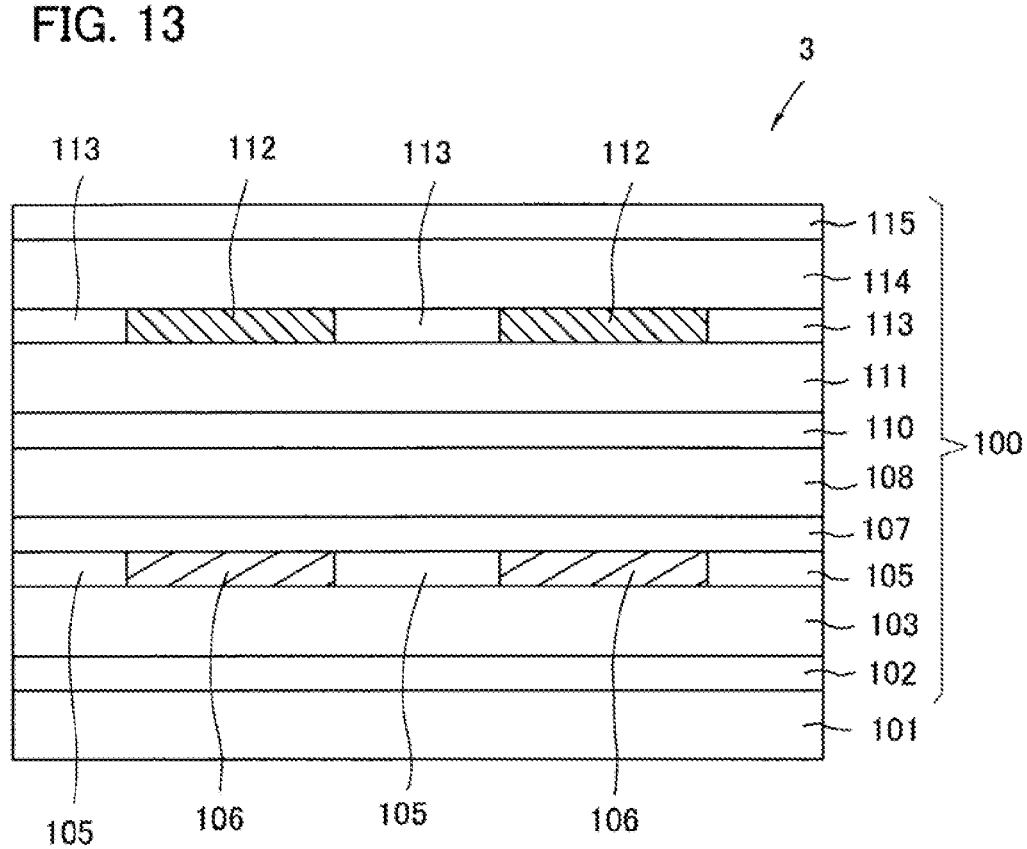
FIG. 13 is a sectional view of the display device of FIG. 2 in which hatching is omitted in a region other than a light-shielding part and a thin film transistor in order to facilitate understanding.

As illustrated in FIG. 13, the liquid crystal part 100 is provided with a first polarizing member 102, a first insulating substrate 103, a first transparent electrode layer 105, a thin film transistor 106, a first light distribution layer 107, a liquid crystal layer 108, a second light distribution layer 110, a second transparent electrode layer 111, a light-shielding layer 112, a color filter 113, a second insulating substrate 114, and a second polarizing member 115.

Specifically, as illustrated in FIG. 13, in the liquid crystal part 100, the first polarizing layer 102 is formed on a lower face (a face on the light source part 101 side) of the first insulating substrate 103, and the first transparent electrode layer 105 and the thin film transistor 106 are formed on an upper face (a face on the touch panel 2 side) of the first insulating substrate 103.

Moreover, the first light distribution layer 107 is formed on upper faces of the first transparent electrode layer 105 and the thin film transistor 106, and the liquid crystal layer 108 is formed on an upper face of the first light distribution layer 107.

Further, the second light distribution layer 110 is formed on an upper face of the liquid crystal layer 108, and the second transparent electrode layer 111 is formed on an upper face of the second light distribution layer 110.

The light-shielding layer 112 and the color filter 113 are formed on an upper face of the second transparent electrode layer 111, and the second insulating substrate 114 is mounted on upper faces of the light-shielding layer 112 and the color filter 113. The second polarizing member 115 is formed on an upper face of the second insulating substrate 114.

The first polarizing member 102 is a member that restricts incident light from the light source part 101, and only light in a predetermined vibration direction passes through the first polarizing member 102.

The first insulating substrate 103 is a transparent insulating substrate that has transparency and shields electricity passing through the first transparent electrode layer 105 from the outside.

The first transparent electrode layer 105 is a conductive layer having conductivity, and is an electrode layer for applying voltage to the liquid crystal layer 108.

The thin film transistor 106 is a known thin film transistor.

The first light distribution layer 107 is a layer for aligning liquid crystal molecules in the liquid crystal layer 108 in a certain direction.

The liquid crystal layer 108 is formed of liquid crystal molecules being in a intermediate state between liquid and solid, and has the liquid crystal molecules arranged with a gentle regularity in a natural state.

The liquid crystal layer 108 has a nature of changing the arrangement of the liquid crystal molecules by the application of voltage, and the arrangement of the molecules can be changed by applying voltage between the first transparent electrode layer 105 and the second transparent electrode layer 111.

The liquid crystal layer 108 of the present embodiment has a negative dielectric anisotropy, and has a dielectric constant in the long-axis direction of a liquid crystal molecule smaller than a dielectric constant in the short-axis direction thereof.

The second light distribution layer 110 is a layer for aligning liquid crystal molecules in the liquid crystal layer 108 in a certain direction.

The first light distribution layer 107 and the second light distribution layer 110 may be formed of the same material or may be formed of different materials.

The second transparent electrode layer 111 is a conductive layer having conductivity and paired with the first transparent electrode layer 105, and is an electrode layer for applying voltage to the liquid crystal layer 108.

The light-shielding layer 112 is a layer that covers the thin film transistor 106 in plan view, and is a layer that constitutes the light-shielding part 72 of the display surface 70.

Moreover, the light-shielding layer 112 shields unnecessary light of the color filter 113, and improves contrast.

The color filter 113 is a filter that constitutes the sub-pixel parts 73 of the display surface 70 in plan view.

Moreover, the color filter 113 is a filter that restricts visible light that passes therethrough to light in a certain wavelength range, and the color filter 113 is capable of extracting light of desired color among three primary colors of red (R), green (G), and blue (B).

The second insulating substrate 114 is a transparent insulating substrate that has transparency and shields electricity passing through the second transparent electrode layer 111 from the outside.

The second polarizing member 115 is a member that restricts transmitted light from the second insulating substrate 114, and only light in a predetermined vibration direction passes through the second polarizing member 115.

The light source part 101 is a region that irradiates the liquid crystal part 100 with light.

The light source part 101 is not particularly limited as long as it has a function as a light source. For example, a light-emitting device such as a light-emitting diode (LED) device and an organic electroluminescent (EL) device can be used.

Next, a function of the displaying unit 1 of the first embodiment will be described.

In the displaying unit 1, the second insulating substrate 114 transmits a portion of irradiation light from the color filter 113 of the display device 3 and, the light reaches the second polarizing member 115. Then, only light in a certain vibration direction passes through the second polarizing member 115, is refracted by an interface between the second polarizing member 115 and the first substrate 15 of the touch panel 2, and is introduced into the touch panel 2.

Figure 15A:
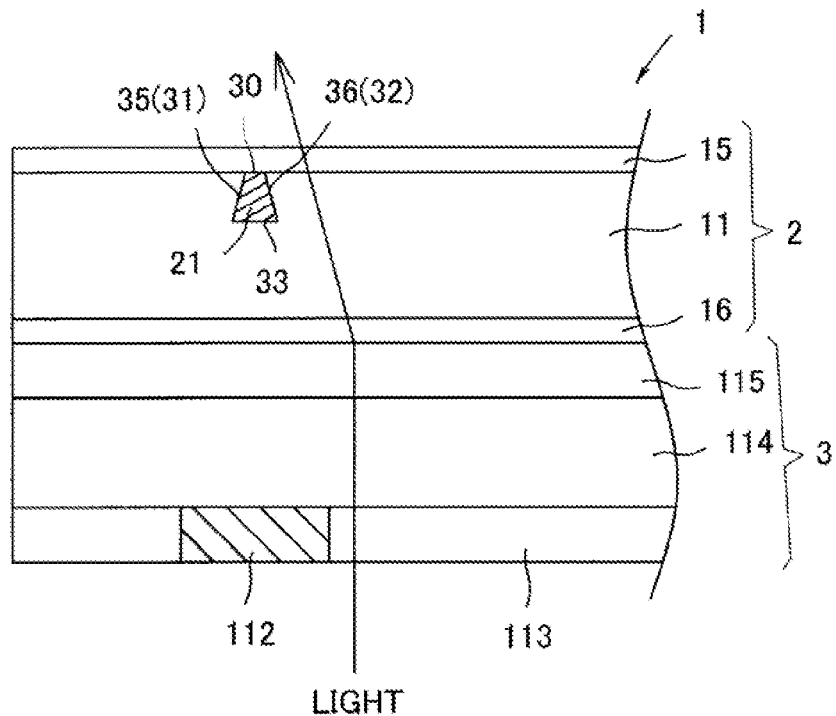
FIGS. 15A and 15B are conceptual diagrams describing a function of the displaying unit according to the first embodiment of the present invention, where
Figure 15B:
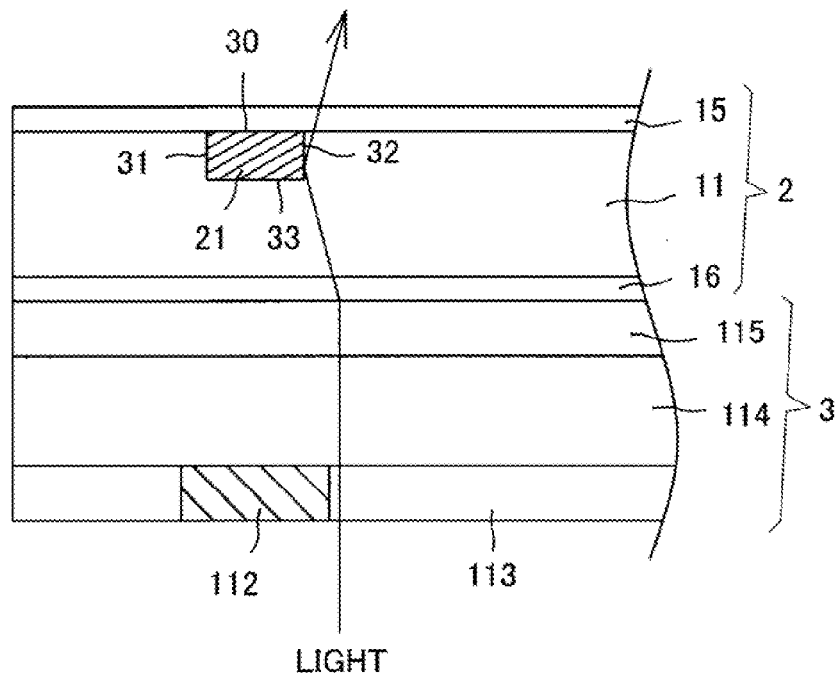

When the side face part 32 (side face part 31) of the first wiring line 21 is upright with respect to the distal end face 33, the light is reflected by the side face part 32 (side face part 31) as illustrated in FIG. 15B. Thus, the light reflected by the side face part 32 travels to the user side, and the side face part 32 of the first wiring line 21 is visible from the user side, which may cause deterioration in appearance.

On the other hand, since the touch panel 2 of the present embodiment includes the inclined surface 36 (inclined surface 35) on the side face part 32 (side face part 31) of the first wiring line 21, the light can pass through without being reflected by the side face part 32 (side face part 31) as illustrated in FIG. 15A. Thus, it is possible to prevent light reflected by the inclined surfaces 35, 36 of the side face parts 31, 32 from travelling to the user side.

Figure 16A:
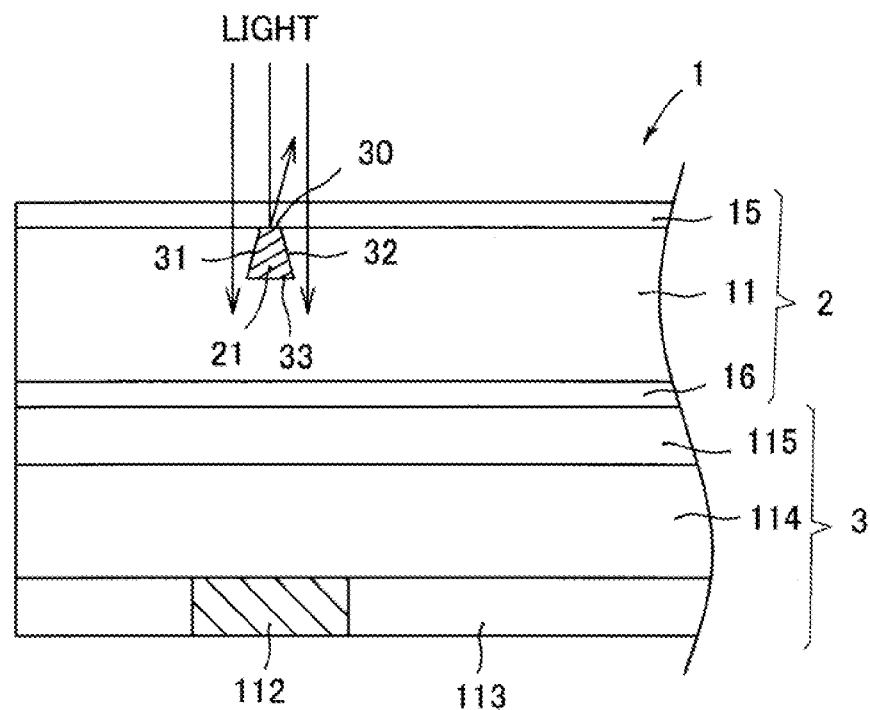
FIGS. 16A and 16B are conceptual diagrams describing the function of the displaying unit according to the first embodiment of the present invention, where
Figure 16B:
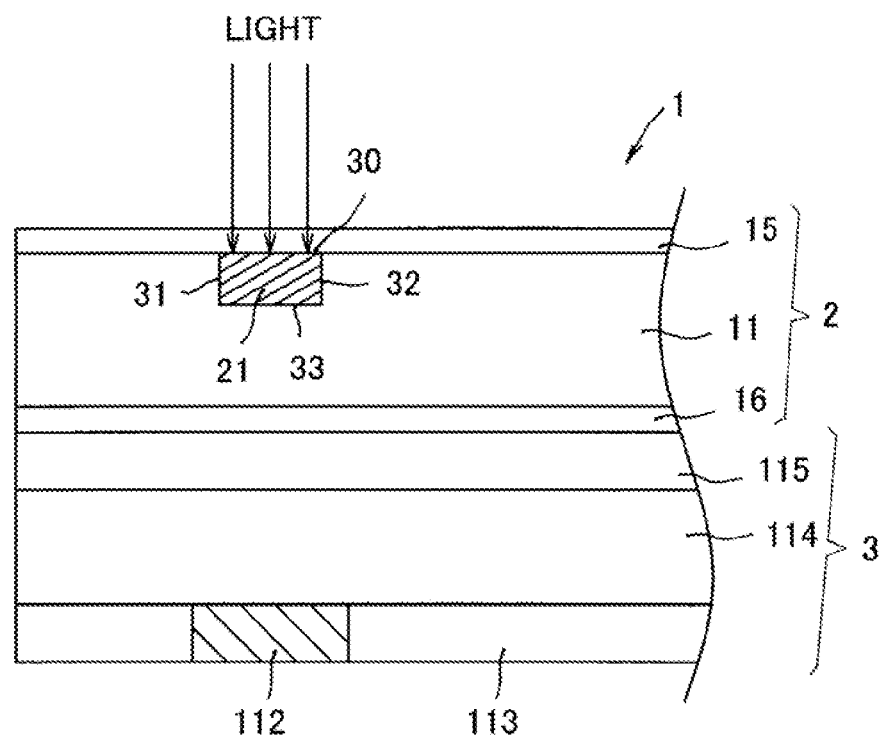

Moreover, as for case of incident light from the user side, in the displaying unit 1 of the present embodiment, the line width of the proximal end face 30 located close to the user side is narrower than the line width of the distal end face 33 located far from the user side. Thus, total reflection by the proximal end face 30 is less prone to occur as illustrated in FIG. 16A as compared to a case in which the side face part 32 (side face part 31) of the first wiring line 21 is upright with respect to the distal end face 33 as illustrated in FIG. 16B, and reflected light is less prone to reach the user. Thus, it is possible to suppress visibility of the first wiring line 21 from the user side owing to the reflection by the proximal end face 30 of the first wiring line 21.

According to the method for manufacturing the displaying unit 1 of the first embodiment, since the respective electrode groups 20, 25 are formed by a semi-additive method, it is possible to reduce an amount of metal to be used.

In the touch panel 2 of the first embodiment, the maximum line width W6 of the second wiring line 26 is larger than the maximum line width W1 of the first wiring line 21. Thus, in the touch panel 2, on the occasion of ensuring the conductive area of the second wiring line 26 be substantially the same as that of the first wiring line 21, the thickness D3 of the second wiring line 26 can be made smaller than the thickness D1 of the first wiring line 21, and the thickness of the entire touch panel 2 can be suppressed.

According to the displaying unit 1 of the first embodiment, since the width W9 of the first light-shielding part 76 is larger than the maximum line width W1 of the first wiring line 21 and the maximum line width W8 of the second redundant line 27, it is possible to suppress generation of moire and to prevent deterioration in quality.

Similarly, according to the displaying unit 1 of the first embodiment, since the width W10 of the second light-shielding part 77 is larger than the maximum line width W3 of the first redundant line 22 and the maximum line width W6 of the second wiring line 26, it is possible to suppress generation of moire and to prevent deterioration in quality.

Next, a displaying unit in a second embodiment will be described. Note that the same configurations as those of the first embodiment will be given the same reference signs, and description thereof will be omitted.

The displaying unit of the second embodiment differs from the displaying unit 1 of the first embodiment in a method for manufacturing a touch panel.

That is, in a touch panel of the second embodiment, a first electrode group 20 and/or a second electrode group 25 is formed by a subtractive method.

Method for Manufacturing Touch Panel by using Subtractive Method

Hereinbelow, a method for manufacturing the touch panel in the second embodiment will be described.

In a first electrode group forming step (electrode group forming step) of the second embodiment, a conductive layer forming step of forming a conductive layer 124 on a first substrate 15 is first performed.

Figure 17A:
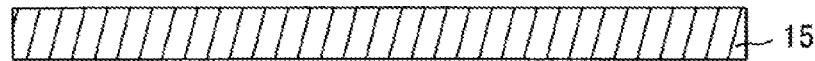
FIGS. 17A to 17F are explanatory diagrams of a method for manufacturing a touch panel of a second embodiment, and illustrate sectional views in respective steps of a first electrode group forming step.
Figure 17B:

Specifically, as illustrated in FIGS. 17A and 17B, a metal catalyst is applied to one face of the first substrate 15 to form a seed layer 80 (seed layer forming step).

Figure 17C:
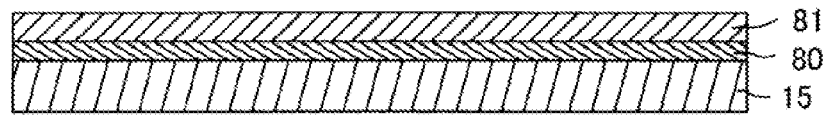

Subsequently, as illustrated in FIG. 17C, a first plating layer 81 is formed by electroless plating on the first substrate 15 having the seed layer 80 formed thereon (first plating step).

Figure 17D:
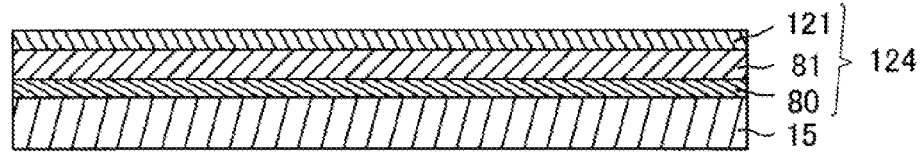

Subsequently, as illustrated in FIG. 17D, a second plating layer 121 is formed by electroplating on the substrate having the first plating layer 81 formed thereon in the first plating step (second plating step).

At this time, the second plating layer 121 is formed on the entire face of the first plating layer 81, and the conductive layer 124 which includes the seed layer 80, the first plating layer 81, and the second plating layer 121 is formed.

Then, a resist step of forming a resist layer 122 patterned in a predetermined shape on the conductive layer 124 is performed.

Figure 17E:
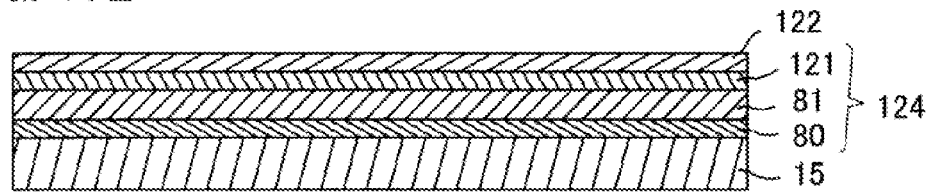

Specifically, as illustrated in FIG. 17E, the resist layer 122 is formed on the substrate having the second plating layer 121 formed thereon (resist layer forming step).

At this time, the resist layer 122 is a positive photoresist layer and formed on the entire face of the second plating layer 121 which forms a surface of the conductive layer 124.

Figure 17F:
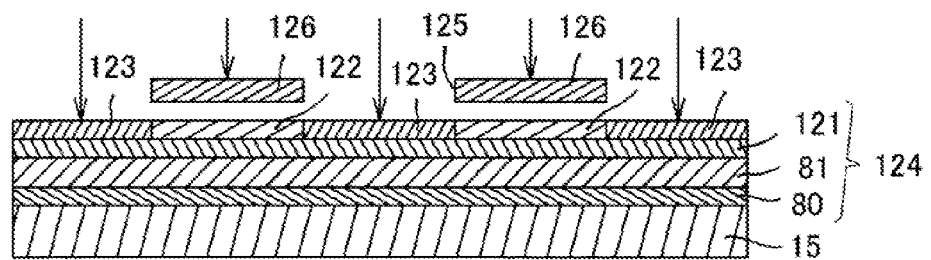

Subsequently, as illustrated in FIG. 17F, a photomask 126 including an opening 125 which has a desired pattern formed thereon so as to cover the resist layer 122 is arranged, and the resist layer 122 is irradiated with ultraviolet rays from an outer side of the photomask 126 (exposure step).

At this time, the resist layer 122 is irradiated with the ultraviolet rays through the opening 125, and a part of the resist layer 122 is exposed to light to form a light-exposed part 123.

Moreover, a position of the opening 125 is opposite to the position of the opening 85 of the photomask 86 of the first embodiment.

Figure 18A:
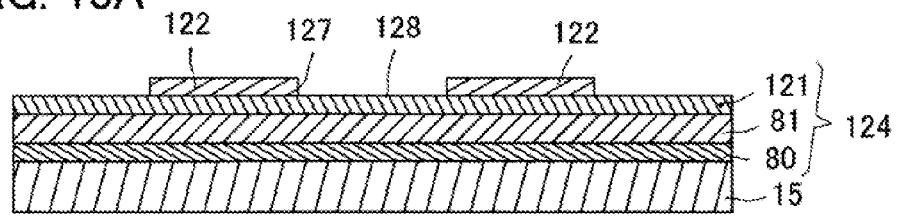
FIGS. 18A to 18D are explanatory diagrams of the method for manufacturing the touch panel of the second embodiment, and illustrate sectional views in respective steps of the first electrode group forming step.

Subsequently, as illustrated in FIG. 18A, the photomask 126 is removed, and development is performed to remove the light-exposed part 123 of the resist layer 122 (development step).

At this time, a through hole 127 having a predetermined pattern is formed on the resist layer 122, and an exposed part 128 having a part of the second plating layer 121 exposed through the through hole is formed.

Figure 18B:
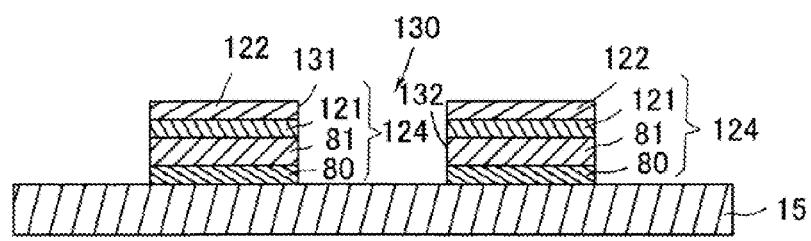

Then, the substrate having the resist layer 122 patterned as illustrated in FIG. 18B and formed thereon in the resist step is immersed in an etching solution to expose the exposed part 128 of the second plating layer 121 to the etching solution to partially remove the conductive layer 124. In this manner, the conducive layer 124 is patterned (first etching step).

At this time, a dissolved hole 130 is formed on the conductive layer 124. Side faces 131, 132 of this dissolved hole 130 are substantially plane and upright with respect to the substrate.

Figure 18C:
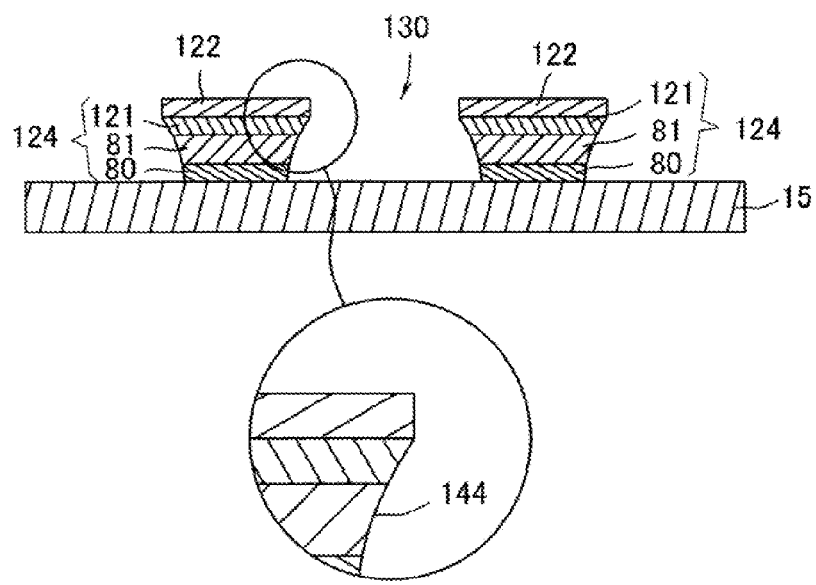

Subsequently, the etching solution is washed away, and an etching solution is introduced into the dissolved hole 130 at a predetermined rate as illustrated in FIG. 18C to perform etching (second etching step).

At this time, the side faces 131, 132 of the dissolved hole 130 erode from a bottom side (the first substrate 15 side), and inclined surfaces 144 are formed on side faces of the conductive layer 124. That is, inclined surfaces 35, 36 of a first wiring line 21 and inclined surfaces 45, 46 of a first redundant line 22 are formed.

Figure 18D:
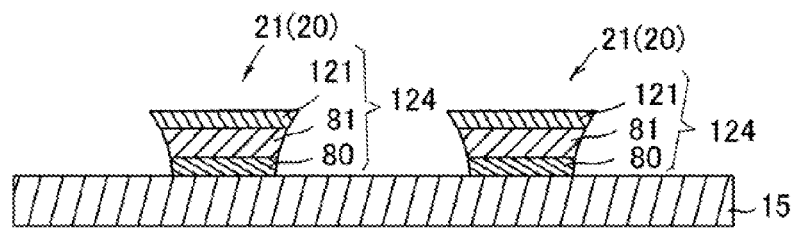

Subsequently, as illustrated in FIG. 18D, a resist remover is used to remove the resist layer 122 (resist removing step), water-washing or the like is performed to form the desired first electrode group 20 on the first substrate 15, and the first electrode group forming step ends.

In the method for manufacturing the touch panel of the present embodiment, a second electrode group forming step (electrode group forming step) of forming a second electrode group 25 on a second substrate 16 is performed by a subtractive method in a separate step.

Since this second electrode group forming step includes substantially the same basic steps as those in the first electrode group forming step described above, different steps from those in the first electrode group forming step will be described.

Figure 19A:
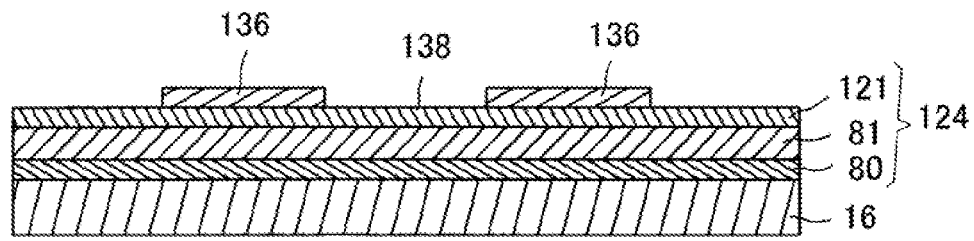
FIGS. 19A to 19C are explanatory diagrams of the method for manufacturing the touch panel of the second embodiment, and illustrate sectional views in respective steps of a second electrode group forming step.
Figure 19B:
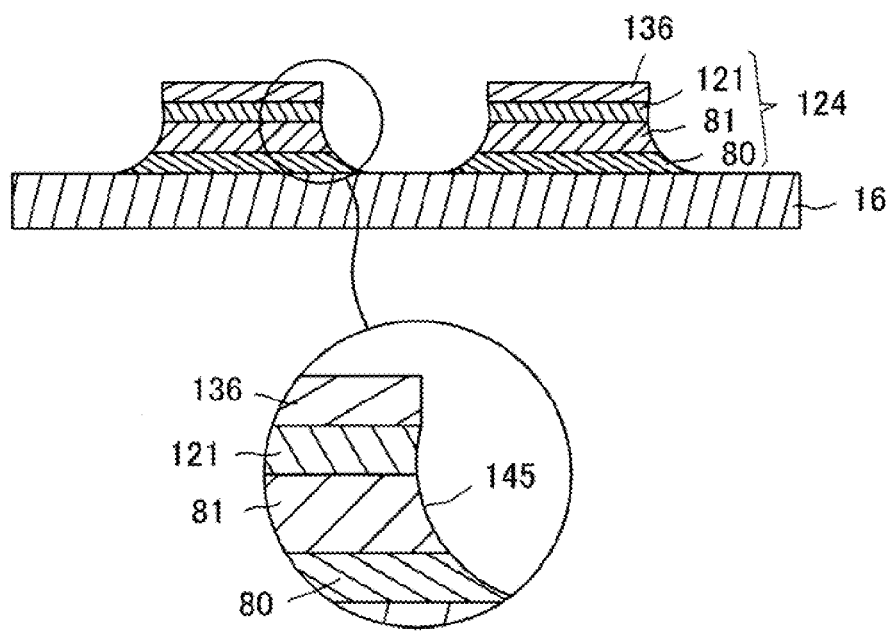

A substrate having a resist layer 136 patterned as illustrated in FIGS. 19A and 19B and formed thereon in a resist step is immersed in an etching solution to expose an exposed part 138 of the second plating layer 121 to partially remove the conductive layer 124. In this manner, the conductive layer 124 is patterned (third etching step).

At this time, an etching speed or the like is controlled to perform side etching on the conductive layer 124 to form inclined surfaces 145 on the side faces of the conductive layer 124. That is, inclined surfaces 55, 56 of a second wiring line 26 and inclined surfaces 65, 66 of a second redundant line 27 are formed.

Moreover, an etch factor at this time is preferably 0.47 or more and 5.67 or less.

Note that the "etch factor" described herein indicates a ratio between an etching depth in the thickness direction of a conductor and an etching depth in the width direction of the conductor. That is, the etch factor is a value obtained by dividing an etching depth T in the thickness direction by an etching depth D in the width direction.

Figure 19C:
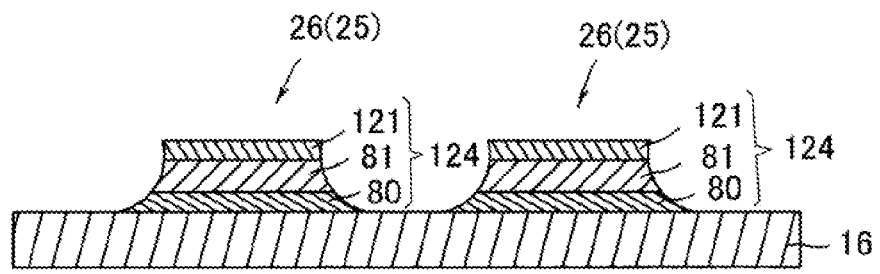

Subsequently, as illustrated in FIG. 19C, a resist remover is used to remove the resist layer 136 (resist removing step), and water-washing or the like is performed to form the desired second electrode group 25 on the second substrate 16. Then, the second electrode group forming step ends.

According to the method of manufacturing the touch panel of the second embodiment, since the inclined surfaces 55, 56, 65, 66 of the second electrode group 25 are formed by side etching, a plurality of inclined surfaces can be formed simultaneously.

Next, a displaying unit in a third embodiment will be described. Note that the same configurations as those of the first and second embodiments will be given the same reference signs, and description thereof will be omitted.

The displaying unit of the third embodiment differs from the displaying unit 1 of the first embodiment in a method for manufacturing a touch panel.

Specifically, patterning of respective electrode groups 20, 25 of a touch panel of the third embodiment is performed by laser scribe.

Hereinbelow, the method for manufacturing the touch panel of the third embodiment will be described. Note that since the method for manufacturing the touch panel is the same as the method for manufacturing the touch panel 2 of the first embodiment except for a first electrode group forming step of forming the first electrode group 20 and a second electrode group forming step of forming the second electrode group 25, description of the same steps will be omitted.

Method for Manufacturing Touch Panel 2 by Using Laser Generator

Figure 20A:
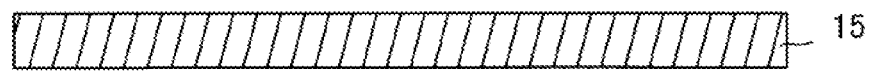
FIGS. 20A to 20D are explanatory diagrams of a method for manufacturing a touch panel of a third embodiment, and illustrate sectional views in respective manufacturing steps of a first electrode group forming step.
Figure 20B:
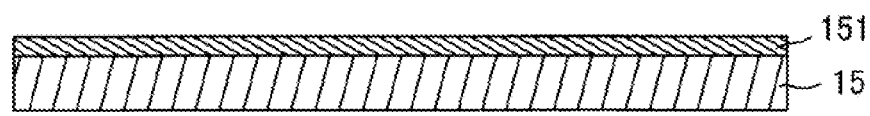

First, in the first electrode group forming step (electrode group forming step) of the third embodiment, as illustrated in FIGS. 20A and 20B, a conductive layer 151 is formed on a first substrate 15 (conductive layer forming step).

A method for forming the conductive layer 151 at this time is not particularly limited. For example, a sputtering method, a vacuum deposition method, or plating can be employed.

Figure 20C:
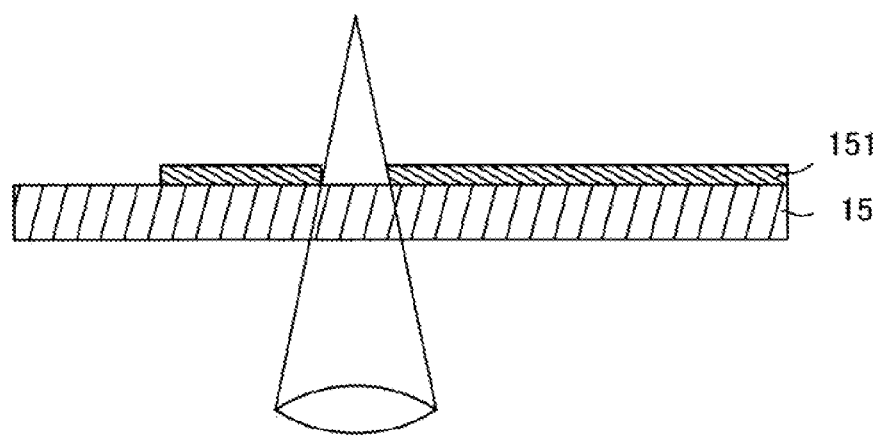

Subsequently, a laser scribe device (laser generator) is used to irradiate the conductive layer 151 with laser light from the first substrate 15 side as illustrated in FIG. 20C to remove a part of the conductive layer 151 (first laser step).

The laser light used at this time is a Gaussian beam having an intensity distribution of Gaussian distribution.

Figure 20D:
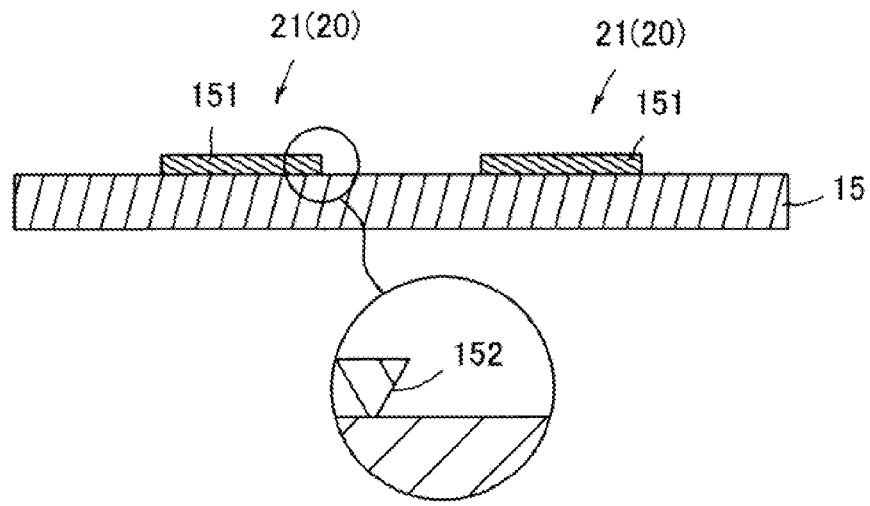

Thus, an end face in the plane direction of the remaining conductive layer 151 forms an inclined surface 152 as illustrated in FIG. 20D. That is, inclined surfaces 35, 36 of a first wiring line 21 and inclined surfaces 45, 46 of a first redundant line 22 are formed.

Note that the laser scribe device includes an X/Y table, a laser generator, and an optical system member. A first laser scribe step is performed in such a manner that a substrate is placed on the X/Y table and linearly moved at a certain speed in the lengthwise direction while the substrate is irradiated with the laser beam. Then, the X/Y table is moved in the transverse direction to shift an irradiation position of the laser beam, and the substrate is again linearly moved in the lengthwise direction while the substrate is irradiated with the laser beam.

Subsequently, water-washing or the like is performed to form the first electrode group 20.

Moreover, a second electrode group forming step (electrode group forming step) is performed in a separate step.

Figure 21A:
FIGS. 21A to 21D are explanatory diagrams of the method for manufacturing the touch panel of the third embodiment, and illustrate sectional views in respective manufacturing steps of a second electrode group forming step.
Figure 21B:
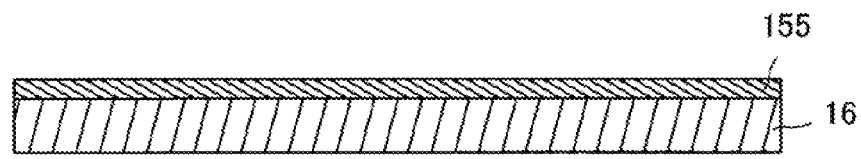

First, in the second electrode group forming step, as illustrated in FIGS. 21A and 21B, a conductive layer 155 is formed on a second substrate 16 (conductive layer forming step).

A method for forming the conductive layer 155 at this time is not particularly limited. For example, a sputtering method, a vacuum deposition method, or plating can be employed.

Figure 21C:
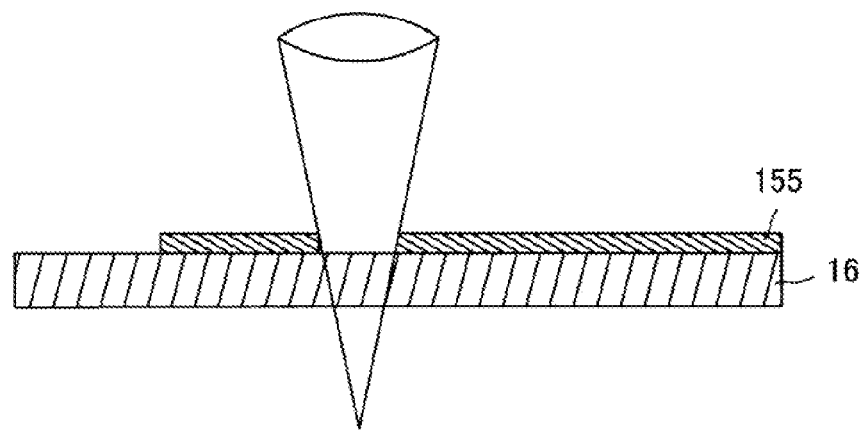

Subsequently, as illustrated in FIG. 21C, the laser scribe device is used to irradiate the conductive layer 155 with laser light from a surface side of the conductive layer 155 (a side opposite to the second substrate 16) to remove a part of the conductive layer 155 to form the second electrode group 25 (second laser step).

Figure 21D:
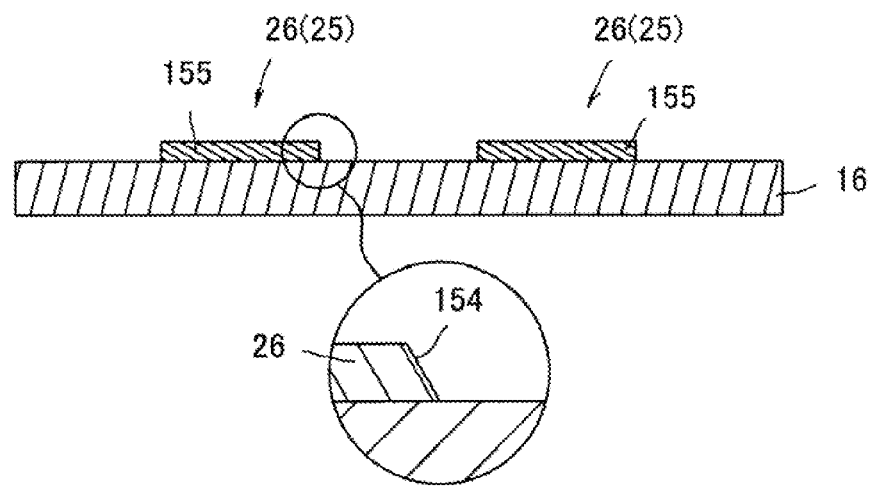

That is, the laser light irradiation in the second laser step is performed from a side opposite to that in the first laser step. Thus, an end face in the plane direction of the remaining conductive layer 155 forms an inclined surface 154 as illustrated in FIG. 21D. That is, inclined surfaces 55, 56 of a second wiring line 26 and inclined surfaces 65, 66 of a second redundant line 27 are formed.

Subsequently, water-washing or the like is performed to form the second electrode group 25.

According to the method for manufacturing the touch panel of the third embodiment, patterning can be performed without need of chemical etching. Thus, the respective electrode groups 20, 25 are less prone to be affected by alkali or the like.

Moreover, according to the method for manufacturing the touch panel of the third embodiment, it is not necessary to use a resist layer. Thus, it is possible to reduce cost as compared to the case in which the resist layer is used.

Figure 22A:
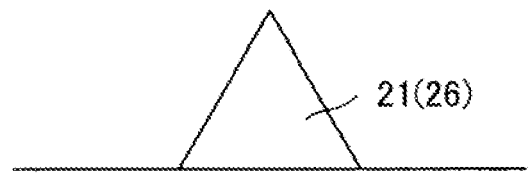
FIGS. 22A to 22D are explanatory diagrams of first wiring lines in other embodiments of the present invention, and illustrate sectional views in the respective different embodiments.
Figure 22B:
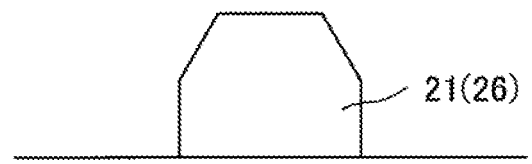
Figure 22C:

Although, in the above embodiments, any of the first wiring line 21, the first redundant line 22, the second wiring line 26, and the second redundant line 27 has a isosceles trapezoidal cross section, the present invention is not limited thereto. For example, the cross-sectional shape of any of the first wiring line 21, the first redundant line 22, the second wiring line 26, and the second redundant line 27 may be a triangular shape as illustrated in FIG. 22A or may be a hexagonal shape as illustrated in FIG. 22B. Moreover, the cross-sectional shape of any of the first wiring line 21, the first redundant line 22, the second wiring line 26, and the second redundant line 27 may be a shape with a rounded distal end face as illustrated in FIG. 22C or may be a trapezoidal shape with respective legs of different lengths. Further, the cross-sectional shape of any of the first wiring line 21, the first redundant line 22, the second wiring line 26, and the second redundant line 27 may be a semi-circular shape or may be a semi-elliptical shape.

Among these shapes, in view of a shape that is prone to bonding to an adhesive and less prone to reflection of light from the display device 3 side and from the user side, the cross-sectional shape of any of the first wiring line 21, the first redundant line 22, the second wiring line 26, and the second redundant line 27 is preferably a isosceles trapezoidal shape or a triangular shape.

Figure 22D:
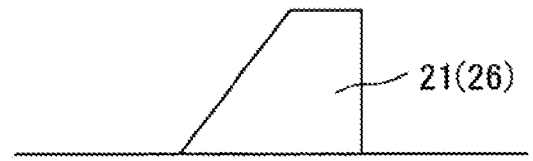

Although, in the above embodiments, since any of the first wiring line 21, the first redundant line 22, the second wiring line 26, and the second redundant line 27 has a isosceles trapezoidal cross section, the face (the outer end face) on the user side is located on the center in the width direction (the direction perpendicular to the longitudinal direction) of the end face (the inner end face) on the display device 3 side in plan view, the present invention is not limited thereto. As illustrated in FIG. 22D, the outer end face may be located at a position shifted from the center of the inner end face.

Although, in the above embodiments, a pitch between the first wiring lines 21, 21 and a pitch between the second wiring lines 26, 26 are uniquely determined, the present invention is not limited thereto.

For example, in the actual manufacture of the displaying unit 1, it may be necessary to manufacture the touch panel 2, corresponding to a plurality of types of display devices.

In this case, it is difficult to place the redundant lines 22, 27 within all of the light-shielding parts 72 due to an increase in the number of the redundant lines 22, 27.

Moreover, there is a unique interval between the light-shielding parts 72 (an interval between the first light-shielding parts 76, 76 and an interval between the second light-shielding parts 77, 77) depending on the types of display devices. Thus, in order to place the redundant lines 22, 27 within all of the light-shielding parts 72, it is necessary to design the redundant lines 22, 27, corresponding to the interval between the light-shielding parts 72 of each display device.

Thus, in the touch panel 2 of the present invention, when pitches between the light-shielding parts 72, 72 of M types of display devices are defined as $N_1, N_2, N_3, \ldots, N_M$ (both N and M are integers), respectively, a pitch between the first redundant lines 22, 22 and/or a pitch between the second redundant lines 27, 27 may be a length of a least common multiple (LCM) $(N_1, N_2, N_3, \ldots, N_M)$ of the intervals $N_1, N_2, N_3, \ldots, N_M$ between the light-shielding parts 72 of the respective display devices.

For example, a case of adapting the touch panel 2 to two types (M types) of display devices will be described.

That is, when the touch panel 2 is applied to a display device in which a pitch $(N_1)$ between the second light-shielding parts 77, 77 is 2 mm and a display device in which a pitch $(N_2)$ between the second light-shielding parts 77, 77 is 3 mm, a pitch between the first redundant lines 22, 22 of the touch panel 2 is set at 6 mm (LCM $(N_1, N_2)$) which is a least common multiple of 2 mm $(N_1)$ and 3 mm $(N_2)$. In this manner, the touch panel 2 can be adapted to the two types of display devices.

Setting the interval between the redundant lines 22, 27 of the touch panel 2 in this manner can improve productivity.

Although, in the above embodiments, the maximum line width W1 of the first wiring line 21 is substantially the same as or smaller than the maximum line width W8 of the second redundant line 27, the present invention is not limited thereto. The maximum line width W1 of the first wiring line 21 may be larger than the maximum line width W8 of the second redundant line 27.

In this case, since the second redundant line 27 is covered with the first wiring line 21 and is invisible from the user side, reduction in an aperture ratio owing to the existence of the second redundant line 27 can be prevented.

Although, in the above embodiments, the first redundant line 22 and the second redundant line 27 are provided, the present invention is not limited thereto. The first redundant line 22 and the second redundant line 27 may not be provided.

Although, in the above embodiments, the first redundant line 22 and the second redundant line 27 are placed so as to overlap the light-shielding part 72 of the display device 3, the present invention is not limited thereto. The first redundant line 22 and the second redundant line 27 may be arranged so as to overlap the sub-pixel parts 73 in plan view.

Although, in the above embodiments, the touch panel 2 is directly mounted on the display device 3, the present invention is not limited thereto. Another member may be interposed between the display device 3 and the touch panel 2.

Figure 23:
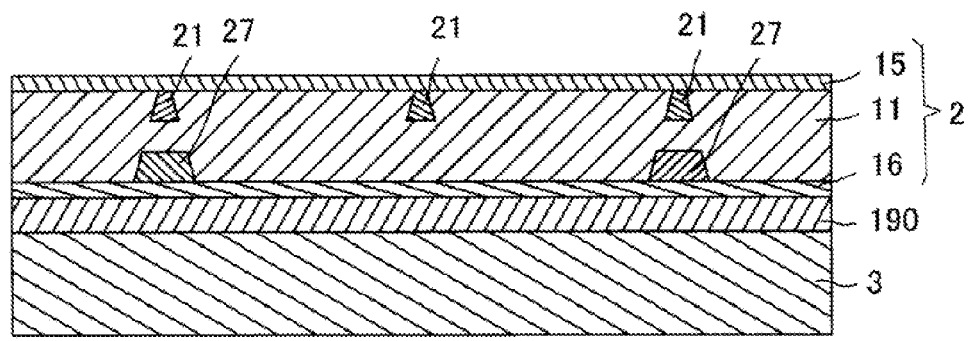
FIG. 23 is a sectional view schematically illustrating a displaying unit in another embodiment of the present invention.

For example, as illustrated in FIG. 23, a refractive sheet 190 (refractive member) which refracts light from the display device 3 may be provided to expand a viewing angle of the display device 3.

In this case, the shapes of the side faces of the respective electrode groups 20, 25 are preferably formed corresponding to an optical path from the refractive sheet 190.

Figure 24:
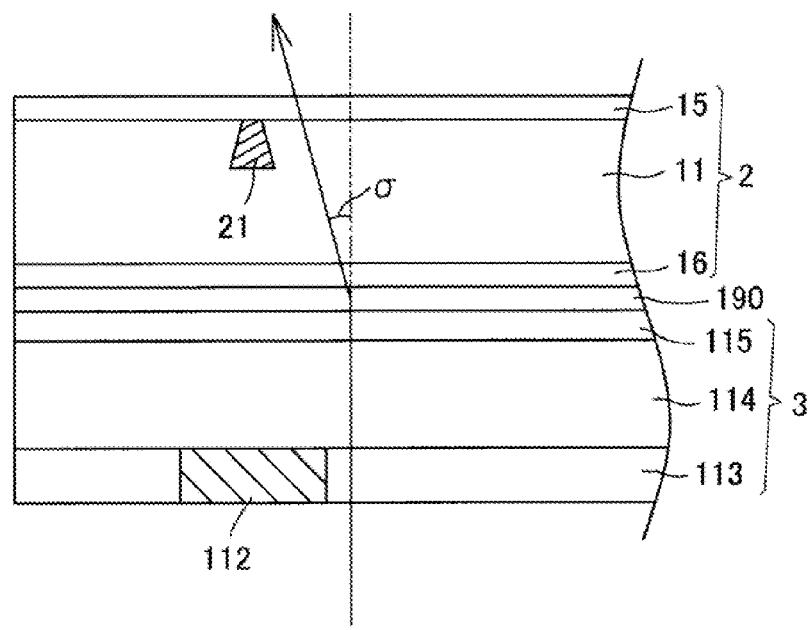
FIG. 24 is an explanatory diagram of an optical path inside the displaying unit of FIG. 23.

Specifically, as illustrated in FIG. 24, when light from the display device 3 is perpendicularly incident on the refractive sheet 190, and an incident angle on the touch panel 2 of light transmitted through the refractive sheet 190 is σ, the inclination angles θ1 to θ8 of the respective inclined surfaces are each preferably an angle (90−σ) or less.

In this manner, it is possible to prevent light transmitted through the refractive sheet 190 from being reflected by the inclined surfaces.

Note that even in a case where the refractive sheet 190 is not interposed, the inclination angles θ1 to θ8 of the respective inclined surfaces may each be an angle (90−δ) or less, when δ is an incident angle on the touch panel 2, due to the same reason as above.

Although, in the above embodiments, a metal catalyst is applied to form the seed layer 80, and the first plating layer 81 is formed on the seed layer 80 to be used as a base layer at the time of forming the second plating layer 83, the present invention is not limited thereto. A method for forming the base layer is not particularly limited. For example, the base layer may be formed by a sputtering method. Moreover, the base layer may have a multilayer structure including three or more layers or may have a single-layer structure.

Although, in the above embodiments, the first electrode part 10 and the second electrode part 12 are bonded to each other with the dielectric member 11 such that the first electrode group 20 and the second electrode group 25 face each other, to form the touch panel 2, a positional relationship between the respective regions of the first electrode part 10 and the second electrode part 12 is not limited thereto.

Figure 25A:
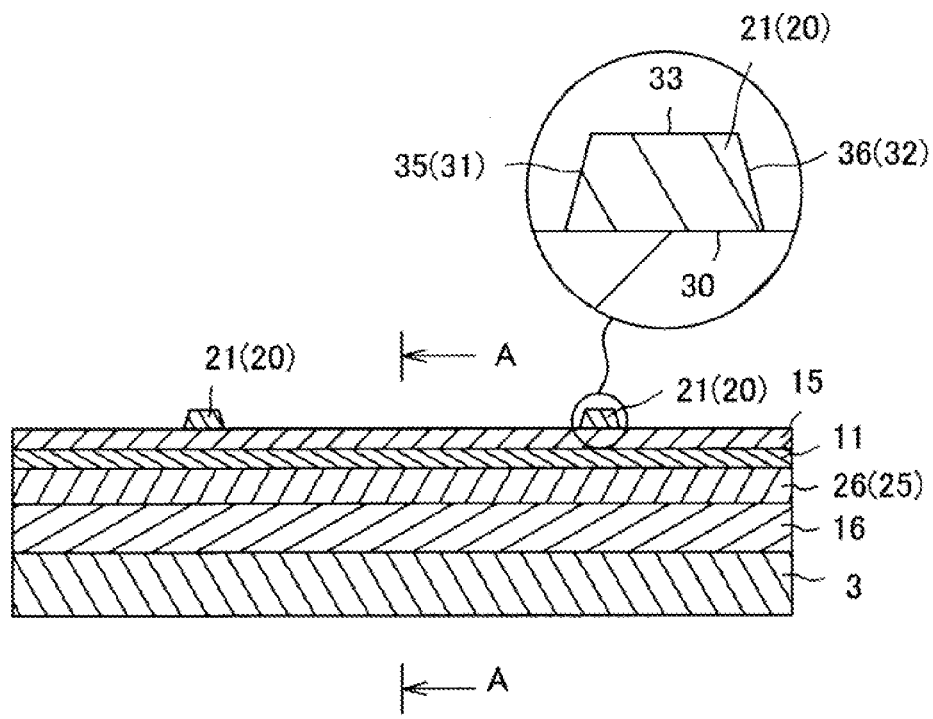
FIGS. 25A and 25B are explanatory diagrams of a touch panel in another embodiment of the present invention, where
Figure 25B:
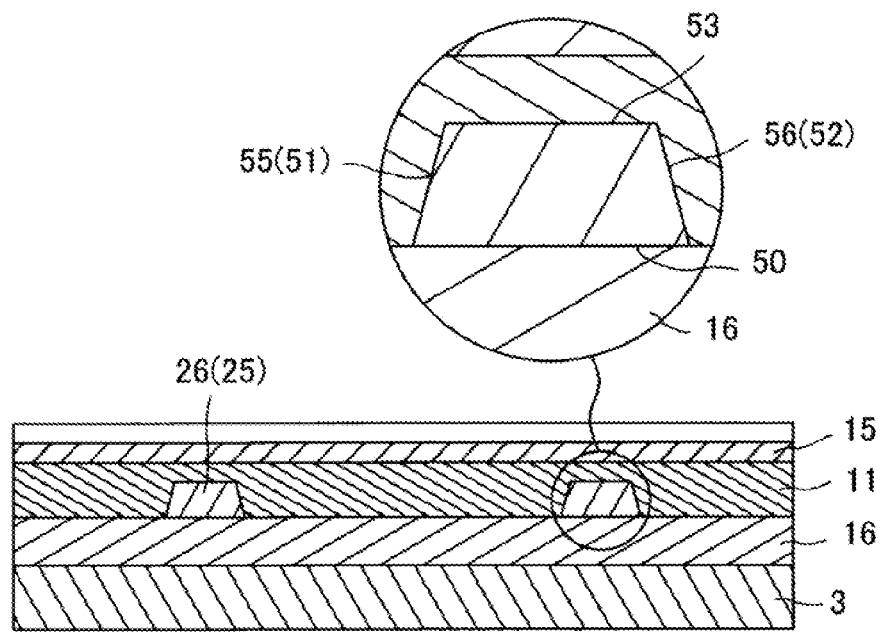

For example, as illustrated in FIGS. 25A and 25B, the touch panel may have a structure where the first substrate 15 is located between the first electrode group 20 and the second electrode group 25.

In this case, in the first electrode group 20, as illustrated in FIG. 25A, the line width of the distal end face 33 located on the user side becomes smaller than the line width of the proximal end face 30 located far from the user side. That is, the side face parts 31, 32 (side face parts 41, 42) each have a tapered shape in the cross-sectional shape of the first electrode group 20.

That is, the first wiring line 21 has the cross-sectional area gradually decreased from the proximal end side toward the distal end side in the thickness direction, and the line width of the proximal end face 30 larger than the line width of the distal end face 33. Similarly, the first redundant line 22 has the cross-sectional area gradually decreased from the proximal end side toward the distal end side in the thickness direction, and the line width of the proximal end face 40 larger than the line width of the distal end face 43.

Moreover, in the second electrode group 25, as illustrated in FIG. 25B, the line width of the distal end face 53 located on the user side becomes smaller than the line width of the proximal end face 50 located far from the user side. That is, the side face parts 51, 52 (side face parts 61, 62) each have a tapered shape in the cross-sectional shape of the second electrode group 25.

That is, the second wiring line 26 has the cross-sectional area gradually decreased from the proximal end side toward the distal end side in the thickness direction, and the line width of the proximal end face 50 larger than the line width of the distal end face 53. Similarly, the second redundant line 27 has the cross-sectional area gradually decreased from the proximal end side toward the distal end side in the thickness direction, and the line width of the proximal end face 60 larger than the line width of the distal end face 63.

Although, in the above embodiments, the electrode groups 20, 25 are supported respectively by the two substrates 15, 16 to form the touch panel 2, the present invention is not limited thereto.

Figure 26A:
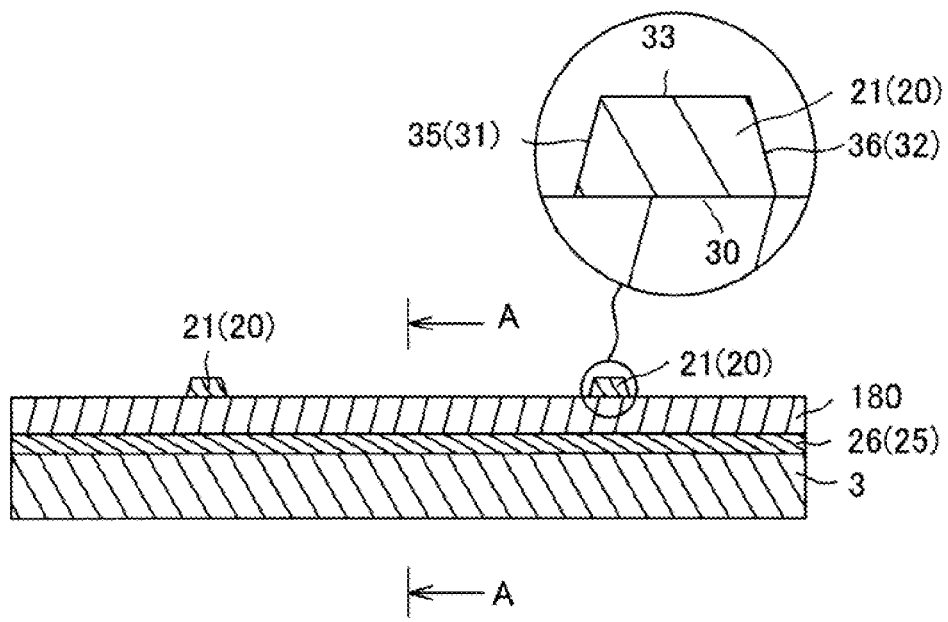
FIGS. 26A and 26B are explanatory diagrams of a touch panel in another embodiment of the present invention, where
Figure 26B:
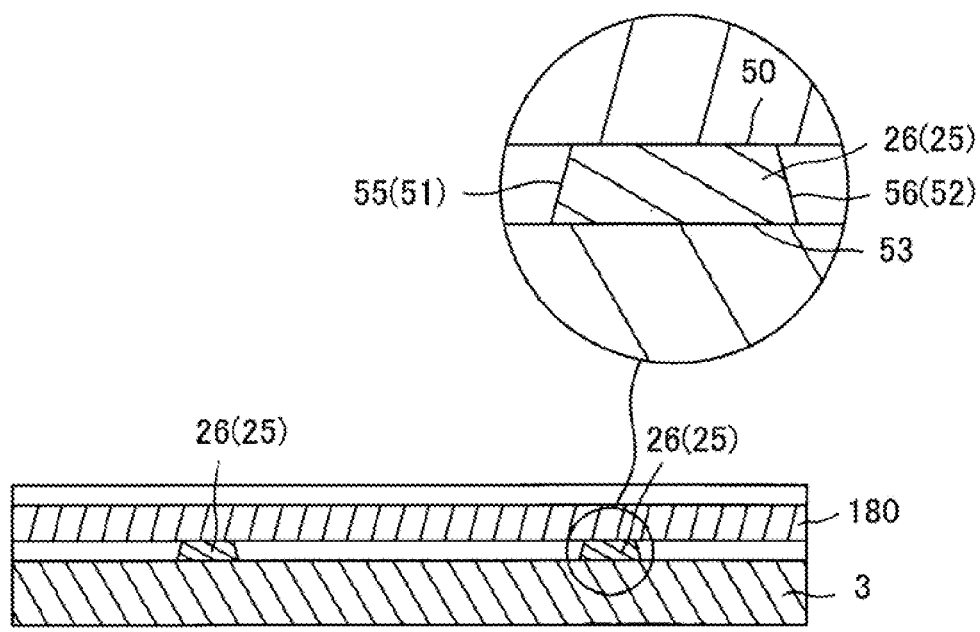

For example, as illustrated in FIGS. 26A and 26B, the first electrode group 20 and the second electrode group 25 may be formed on both faces of a substrate 180.

In this case, in the first electrode group 20, as illustrated in FIG. 26A, the line width of the distal end face 33 located at the user side becomes smaller than the line width of the proximal end face 30 located far from the user side.

Moreover, in the second electrode group 25, as illustrated in FIG. 26B, the line width of the proximal end face 50 located on the user side becomes smaller than the line width of the distal end face 53 located far from the user side.

That is, in the cross-sectional shape of the first electrode group 20, the side face parts 31, 32 (side face parts 41, 42) each have a tapered shape. In the cross-sectional shape of the second electrode group 25, the side face parts 51, 52 (side face parts 61, 62) each have a reverse tapered shape.

Although, in the above embodiments, the first electrode part 10 and the second electrode part 12 are bonded to each other to form the touch panel 2, the present invention is not limited thereto. The touch panel may be formed by sequential lamination on a single substrate 185 as with a touch panel 184 of FIGS. 27A and 27B.

In this touch panel 184, the second electrode group 25, an insulating sheet 186, and the first electrode group 20 are laminated one on another in this order on the substrate 185.

Figure 27A:
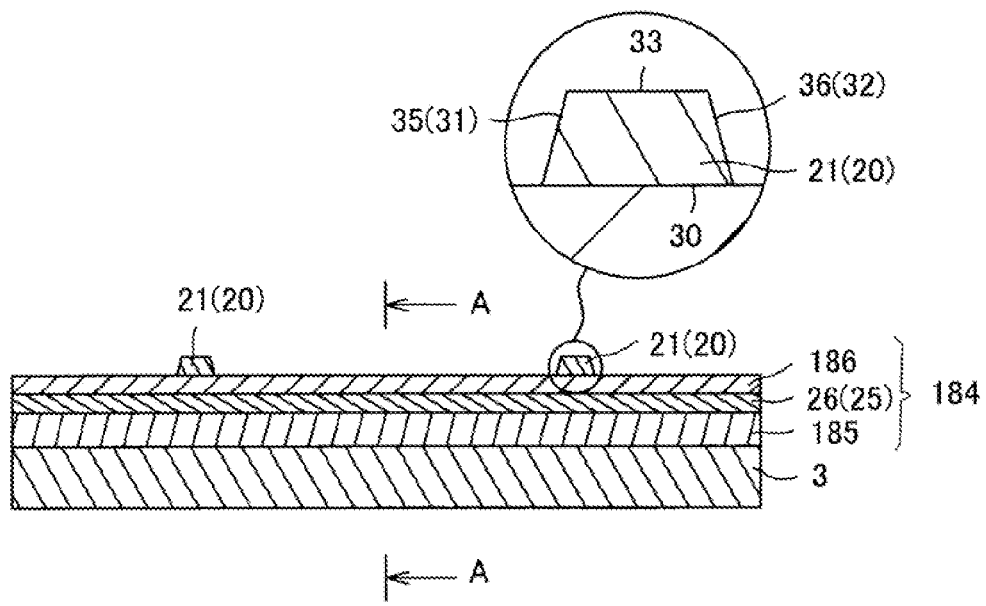
FIGS. 27A and 27B are explanatory diagrams of a touch panel in another embodiment of the present invention, where

In this case, in the first electrode group 20, as illustrated in FIG. 27A, the line width of the distal end face 33 located on the user side becomes smaller than the line width of the proximal end face 30 located far from the user side.

Figure 27B:
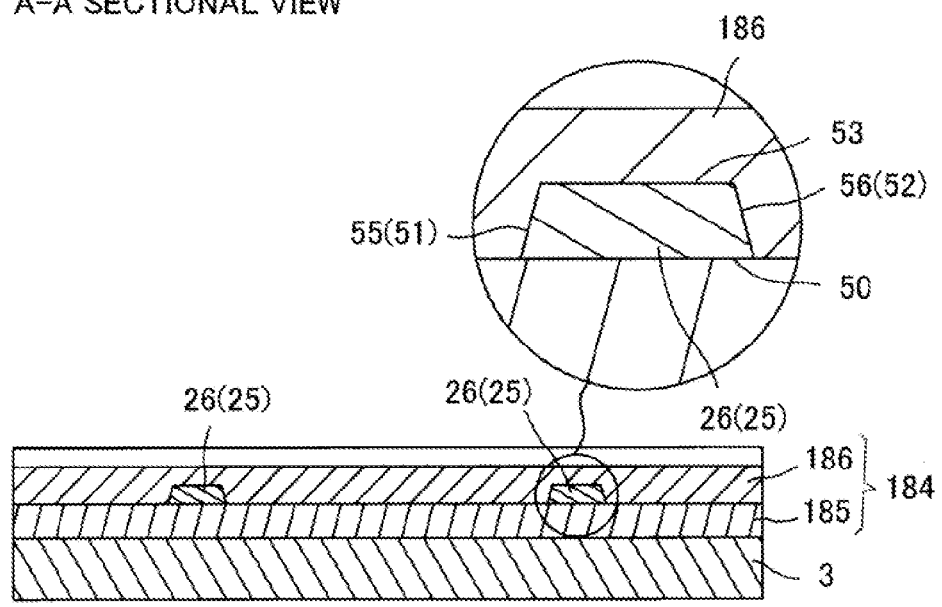

Moreover, in the second electrode group 25, as illustrated in FIG. 27B, the line width of the distal end face 53 located on the user side becomes smaller than the line width of the proximal end face 50 located far from the user side.

That is, in the cross-sectional shape of each of the first electrode group 20 and the second electrode group 25, the side face parts 31, 32 (side face parts 41, 42) and the side face parts 51, 52 (side face parts 61, 62) each have a tapered shape.

Figure 28:
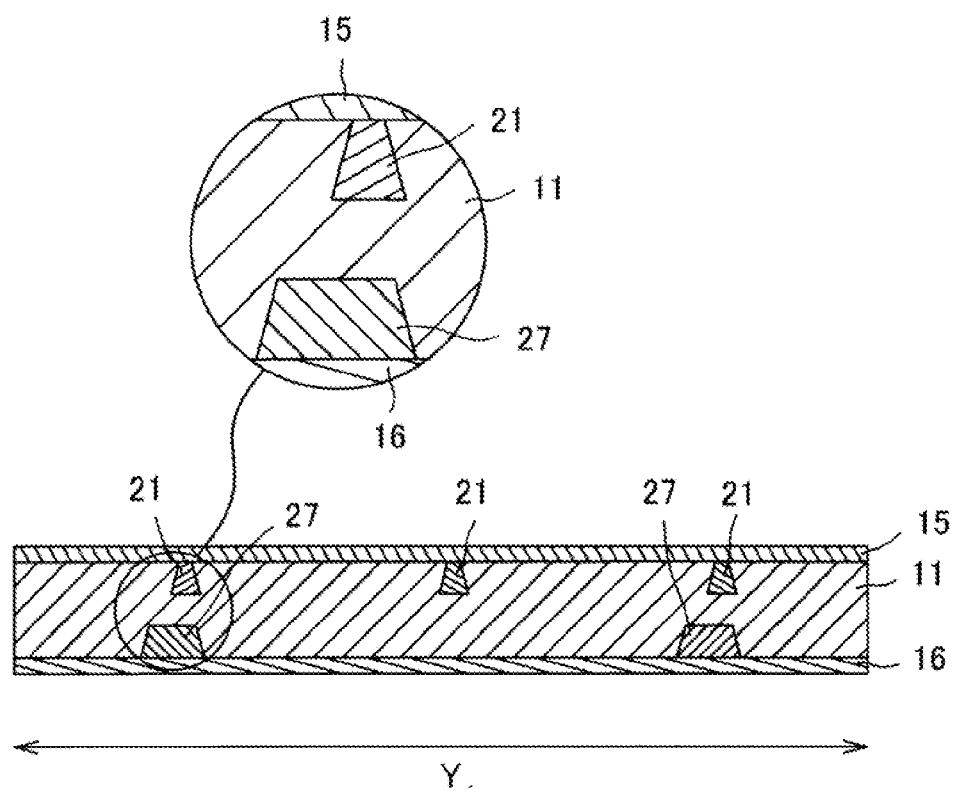
FIG. 28 is a sectional view of a touch panel in another embodiment of the present invention.
Figure 29:
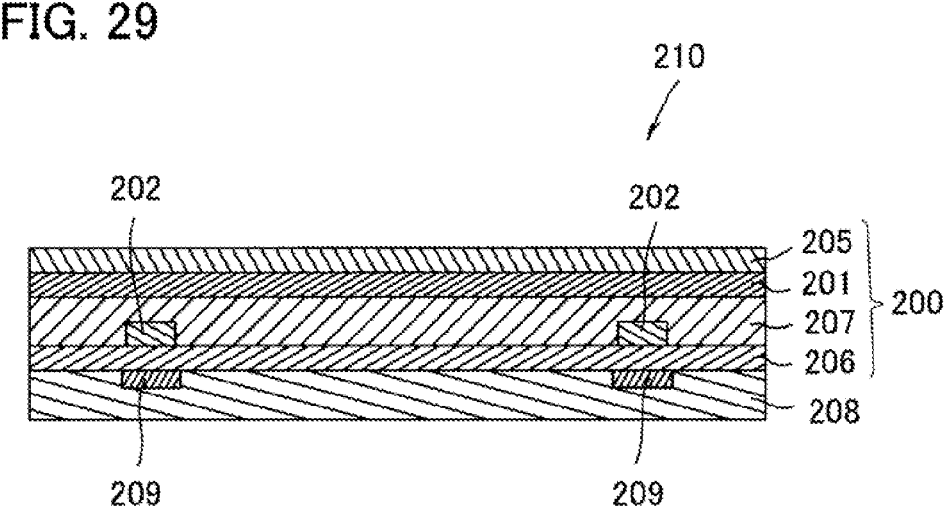
FIG. 29 is a sectional view schematically illustrating a prototyped displaying unit.
Figure 30:
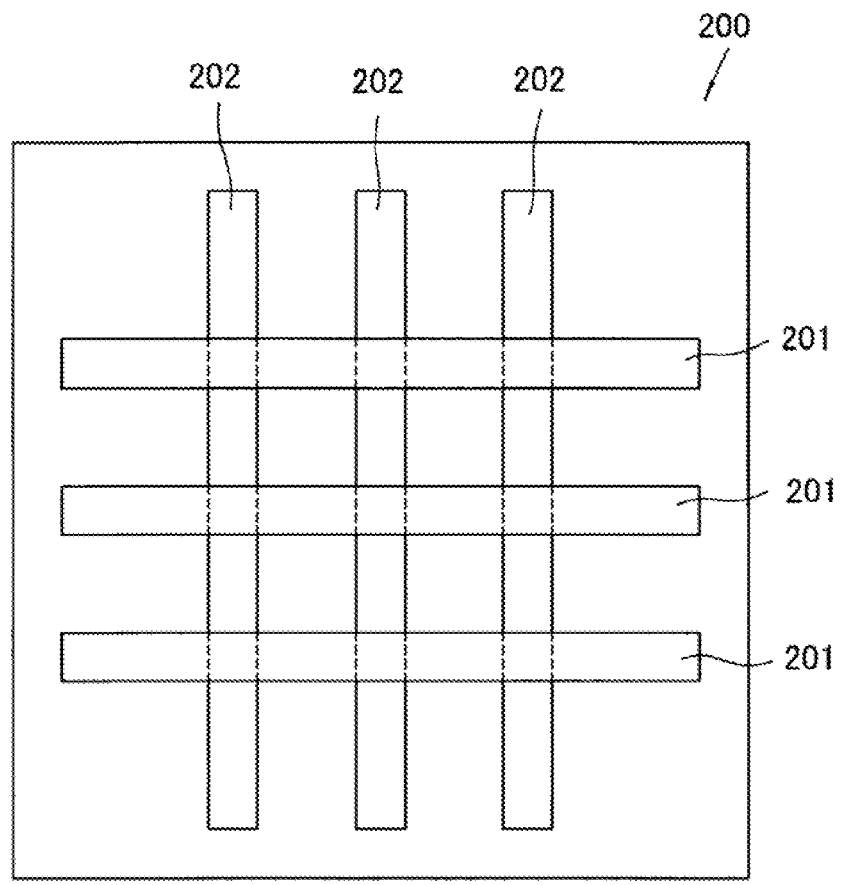
FIG. 30 is a plan view illustrating a positional relationship of prototyped thin metal wire.
Figure 31:
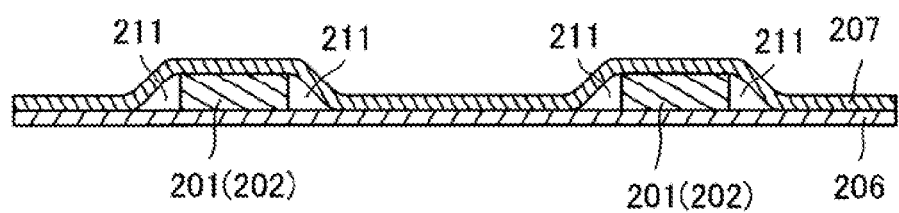
FIG. 31 is a sectional view when an optical clear adhesive film is bonded to the thin metal wire in the prototyped touch panel.

Although, in the above embodiments, the first wiring line 21 is located on the center in the width direction (lengthwise direction Y) of the second redundant line 27, and the first redundant line 22 is located on the center in the width direction (transverse direction X) of the second wiring line 26 in plan view, the present invention is not limited thereto. For example, as illustrated in FIG. 28, the first wiring line 21 may be arranged at a position shifted in the width direction from the center of the second redundant line 27. Similarly, the second wiring line 26 may be arranged at a position shifted in the width direction from the center of the first redundant line 22.

Although, in the above embodiments, the thickness of the second wiring line 26 is made thinner than the thickness of the first wiring line 21 in order to make resistance of the first wiring line 21 be substantially the same as resistance of the second wiring line 26, the present invention is not limited thereto. The first wiring line 21 and the second wiring line 26 may have the same thickness. In this case, the number of the first wiring lines 21 is preferably made larger than the number of the second wiring lines 26.

Although, in the above first embodiment, the first wiring lines 21 and the second wiring lines 26 are aligned in the lengthwise and transverse directions, the present invention is not limited thereto. The first wiring lines 21 and the second wiring lines 26 may be aligned in oblique directions. That is, the first wiring lines 21 and the second wiring lines 26 may intersect with each other so as to be aligned in a rhombus shape.

Although, in the above first embodiment, the first electrode part 10 and the second electrode part 12 are patterned by the same technique, the present invention is not limited thereto. The first electrode part 10 and the second electrode part 12 may be formed by different techniques.

For example, the first electrode part 10 may be patterned by laser scribe, and the second electrode part 12 may be patterned by a subtractive method.

Although, in the above first and second embodiments, a positive resist material is employed as the resist layer, the present invention is not limited thereto. A negative resist material may be employed. In this case, a patterning position of the resist layer is reversed with respect to that in the case of the positive resist material.

Although, in the above third embodiment, a part of the conductive layer 151 is removed by laser light having an intensity distribution of Gaussian distribution, the present invention is not limited thereto. The intensity distribution of the laser light is not limited. Moreover, an inclined surface may be formed by the incident angle on the conductive layer 151 of the laser light.

Although, in the above embodiments, the dielectric member 11 is formed of a single member, the present invention is not limited thereto. The dielectric member 11 may be formed of a plurality of members.

Although, in the above embodiments, the displaying unit is a so-called on-cell type displaying unit in which a display device and a touch panel are formed as separate bodies and the touch panel is mounted on the display device, the displaying unit may be an in-cell type displaying unit in which a touch panel (touch panel section) is incorporated into a display device (display section).

In view of easiness of processing, the displaying unit is preferably an on-cell type displaying unit as in the above embodiments.

Although, in the above embodiments, the first wiring line 21, the first redundant line 22, the second wiring line, and the second redundant line are formed by using plating, the present invention is not limited thereto. The first wiring line 21, the first redundant line 22, the second wiring line, and the second redundant line may be formed by another method such as printing. Moreover, a type of plating is also not limited. The plating may be electroplating or electroless plating.

Moreover, the first wiring line 21 and the first redundant line 22 may be simultaneously formed as in the above embodiments, or may be separately formed. Similarly, the second wiring line 26 and the second redundant line 27 may be simultaneously formed as in the above embodiments, or may be separately formed.

Although, in the above embodiments, the case of using a TFT liquid crystal display as the display device 3 is described, the present invention is not limited thereto. The display device may be a self-luminous type display such as an organic EL display and a plasma display.

LIST OF REFERENCE CHARACTERS 1 displaying unit
2 touch panel (touch panel section)
3 display device (display section)
10 first electrode part
11 dielectric member (dielectric part)
12 second electrode part
15 first substrate (substrate)
16 second substrate (substrate)
20 first electrode group
21 first wiring line
22 first redundant line
25 second electrode group
26 second wiring line
27 second redundant line
31, 32 side face part
33 distal end face (first end)
35, 36 inclined surface
71 pixel part
72 light-shielding part
73 sub-pixel part
76 first light-shielding part
77 second light-shielding part
82, 122 resist layer
83 second plating layer (conductive layer)
84 base layer
90 through hole
124, 151, 155 conductive layer
190 refractive sheet (refractive member)

The invention claimed is:

1. A touch panel attached to a display device,
the display device comprising:
   a pixel part that includes a plurality of sub-pixel parts and that displays color information; and
   a light-shielding part that partitions the sub-pixel parts,
the touch panel being placed so as to cover the pixel part and the light-shielding part,
the touch panel comprising:
   a first electrode part that includes a first electrode group having one or more first wiring lines,
   a second electrode part that includes a second electrode group having one or more second wiring lines; and
   a dielectric part interposed between the first electrode part and the second electrode part,
wherein the first electrode group extends in a direction intersecting with the second electrode group in plan view,
wherein a large part of the first wiring line or the entire first wiring line is arranged so as to overlap the light-shielding part in an entire line width thereof in plan view,
wherein the first electrode part is located in an outer side of the dielectric part on the basis of the display device, and
wherein one or both of the first wiring line and the second wiring line has a line width varied according to a height, and has a line width in an outermost region smaller than a line width in an innermost region on the basis of the display device.

2. The touch panel according to claim 1, wherein the first wiring line has a line width varied according to a height, a line width in the outermost region smaller than a line width in the innermost region on the basis of the display device, and further the line width gradually increases from an outer end toward an inner side.

3. The touch panel according to claim 1, wherein a maximum line width of the first wiring line is smaller than a maximum line width of the second wiring line.

4. The touch panel according to claim 1, wherein the second wiring line has a line width varied according to a height, a line width in the outermost region smaller than a line width in the innermost region on the basis of the display device, and further the line width gradually increases from an outer end toward an inner side.

5. The touch panel according to claim 4, wherein the dielectric part comprises a film-like adhesive part covering the second wiring line from an outer side on the basis of the display device, the adhesive part closely contacting with a side face of the second wiring line substantially with no gap therebetween.

6. The touch panel according to claim 1, wherein the first electrode group comprises:
   at least two first wiring lines arranged in parallel at a predetermined interval; and
   a first redundant line connecting the two first wiring lines.

7. The touch panel according to claim 6,
wherein the first redundant line overlaps the second wiring line in an entire line width in plan view, and
wherein a maximum line width of the first redundant line is smaller than the maximum line width of the second wiring line.

8. The touch panel according to claim 1, wherein the second electrode group comprises:
   at least two second wiring lines arranged in parallel at a predetermined interval, and
   a second redundant line connecting the two second wiring lines.

9. The touch panel according to claim 1, wherein the first wiring line is formed of metal and opaque.

10. A displaying unit comprising a display device and a touch panel attached to the display device,
the display device comprising:
   a pixel part that includes a plurality of sub-pixel parts and that displays color information; and
   a light-shielding part that partitions the sub-pixel parts,
the touch panel being placed so as to cover the pixel part and the light-shielding part,
the touch panel comprising:
   a first electrode part that includes a first electrode group having one or more first wiring lines,
   a second electrode part that includes a second electrode group having one or more second wiring lines; and
   a dielectric part interposed between the first electrode part and the second electrode part,
wherein the first electrode group extends in a direction intersecting with the second electrode group in plan view,
wherein a large part of the first wiring line or the entire first wiring line is arranged so as to overlap the light-shielding part in an entire line width thereof in plan view,
wherein the first electrode part is located in an outer side of the dielectric part on the basis of the display device, and wherein one or both of the first wiring line and the second wiring line has a line width varied according to a height, and has a line width in an outermost region smaller than a line width in an innermost region on the basis of the display device.

11. The displaying unit according to claim 10, comprising a refractive member that refracts light from the sub-pixel parts, the refractive member being interposed between the touch panel and the sub-pixel parts,
- wherein the first wiring line comprises a first end abutting onto the dielectric part and a side face part extending in a direction intersecting with the first end, the side face part being an inclined surface inclined with respect to the first end, and
- wherein when light from the sub-pixel parts is perpendicularly incident onto the refractive member, and an incident angle on the touch panel of the light refracted by the refractive member is $\sigma$, an inclination angle of the inclined surface with respect to the first end is $(90-\sigma)$ or less.

\* \* \* \* \*